United States Patent
Tan

(10) Patent No.: US 12,217,338 B2
(45) Date of Patent: Feb. 4, 2025

(54) DUPLEX CARD SCANNER LIGHTING

(71) Applicant: Hin Leong Tan, Sunnyvale, CA (US)

(72) Inventor: Hin Leong Tan, Sunnyvale, CA (US)

( * ) Notice: Subject to any disclaimer, the term of this patent is extended or adjusted under 35 U.S.C. 154(b) by 124 days.

(21) Appl. No.: 18/128,602

(22) Filed: Mar. 30, 2023

(65) Prior Publication Data

US 2023/0368446 A1  Nov. 16, 2023

Related U.S. Application Data

(63) Continuation-in-part of application No. 17/743,027, filed on May 12, 2022.

(51) Int. Cl.
*G06K 7/10* (2006.01)
*G06T 11/60* (2006.01)
*H04N 1/00* (2006.01)

(52) U.S. Cl.
CPC .......... *G06T 11/60* (2013.01); *G06K 7/10821* (2013.01); *H04N 1/00795* (2013.01); *H04N 2201/0081* (2013.01)

(58) Field of Classification Search
CPC . G07F 7/10821; G07F 7/10831; G07F 7/0873
See application file for complete search history.

(56) References Cited

U.S. PATENT DOCUMENTS

| | | | | |
|---|---|---|---|---|
| 5,642,160 A * | 6/1997 | Bennett | ............. | H04N 7/181 348/E7.086 |
| 7,911,655 B2 * | 3/2011 | Hatzav | ............. | G03B 15/00 358/475 |
| 11,068,677 B1 * | 7/2021 | Tan | ............. | G06V 30/40 |
| 2006/0072822 A1 | 4/2006 | Hatzav et al. | | |
| 2009/0073503 A1 * | 3/2009 | Lebaschi | ............. | H04N 1/193 358/450 |
| 2013/0221101 A1 * | 8/2013 | Lebaschi | ............. | G06K 7/10732 235/454 |
| 2015/0036891 A1 | 2/2015 | Takenouchi et al. | | |

(Continued)

OTHER PUBLICATIONS

International Search Report for PCT/US 23/16885, Jun. 16, 2023.
Written Opinion of the International Seartion Authority for PCT/US 23/16885, Jun. 16, 2023.

*Primary Examiner* — Thien M Le
*Assistant Examiner* — April A Taylor
(74) *Attorney, Agent, or Firm* — Douglas L. Weller

(57) ABSTRACT

A card scanner includes a card support mechanism for receiving a card and a first camera. A first light source is mounted so that a first image of a first side of the card captured by the first camera reflects to the first camera so that a first bright region created by light reflected by the first side of the card from the first light source is within a first location on the first side of the card. A second light source is mounted so that a second image of the first side of the card captured by the first camera reflects to the first camera so that a second bright region created by light reflected by the first side of the card from the second light source is within a second location on the first side of the card, wherein the first location and the second location do not overlap. An image processor combines the first image of the first side of the card with the second image of the first side of the card to produce a first combined image, the first bright region and the second bright region being filtered from the first combined image by the image processor.

27 Claims, 31 Drawing Sheets

(56) References Cited

U.S. PATENT DOCUMENTS

| | | |
|---|---|---|
| 2019/0096057 A1 | 3/2019 | Allen et al. |
| 2019/0130147 A1* | 5/2019 | Ikeda ................. H04N 1/00551 |
| 2022/0147728 A1 | 5/2022 | Tan |

* cited by examiner

DUPLEX CARD SCANNER LIGHTING

BACKGROUND

Card scanners are used to efficiently scan in data from cards such as business cards, driver's licenses, insurance identification cards and other forms of identification cards. The scanners can be simplex card scanners or duplex card scanners. Examples of current card scanners are the BCR901 Simplex Card Scanner and the DX1210 Duplex Card Scanner both currently available from Card Reader Inc, on the website www.bizcardreader.com.

DETAILED DESCRIPTION

When a card scanner that uses a small camera in a constrained housing captures images of glossy documents that have semi-reflective or highly reflective surfaces, such as plastic identification cards and drivers licenses, bright regions may appear in captures images. The following describes various solutions to mitigate this issue in card scanners.

Figure 1:
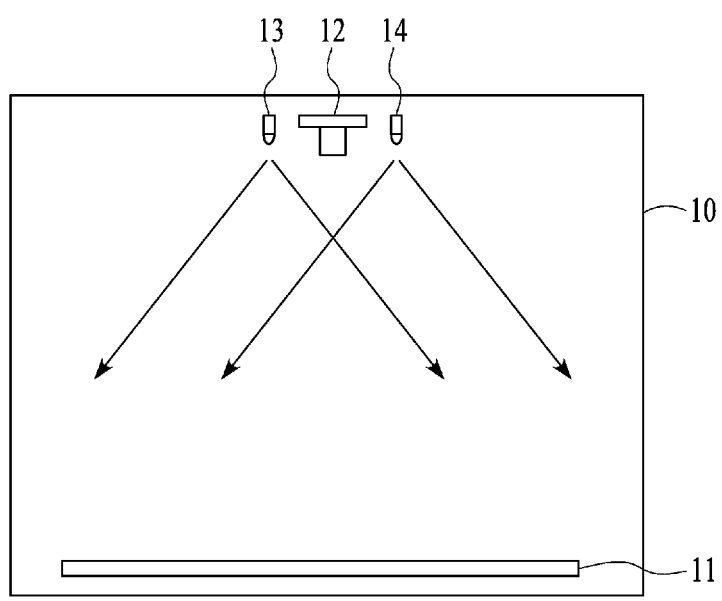
FIG. 1 is a simplified diagram illustrating an image capture setup.

FIG. 1 is a simplified diagram illustrating an image capture setup. A camera housing 10 includes a camera 12 used to capture an image of a card 11. Lighting is provided by a light source 13 and a light source 14. For example, each of light source 13 and light source 14 is a light emitting diode (LED). Alternatively, light source 13 and light source 14 can be implemented using horizontally or vertically extended light sources, each having multiple LEDs. Additionally, a different number of light sources can be used, for example, with LEDs arranged individually, or gathered together within one or more light boxes. A card support mechanism, as further described below, is used to receive and hold card 11. Details of the card support mechanism are omitted from this and other drawings to simplify discussion of other features of the drawings.

The lighting set up shown in FIG. 1 can be effectively used for capturing images of cards with non-glossy surfaces, such as business cards and other similar cards, for example, printed on non-reflective card stock material.

Figure 2:
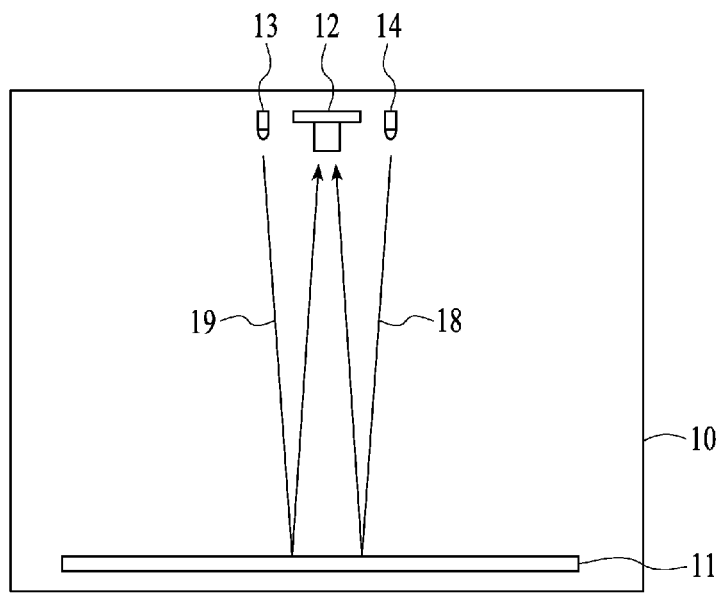
FIG. 2 and FIG. 3 illustrate bright regions that can appear on images of cards with glossy surfaces when using the lighting set up show in FIG. 1.
Figure 3:
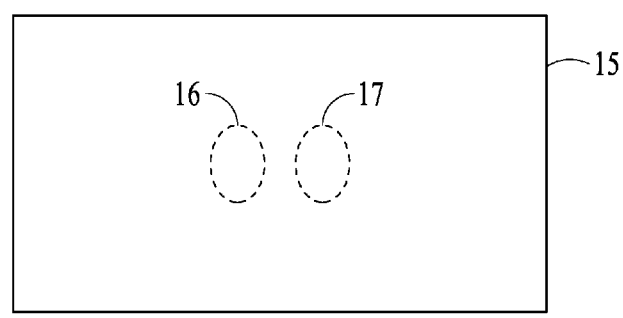

FIG. 2 and FIG. 3 illustrate bright regions that can appear on images of cards with glossy surfaces when using the lighting set up show in FIG. 1. Particularly a light path 19 from light source 13, as shown in FIG. 2 can result in a bright region 16 in a card image 15 of card 11 captured by camera 12, as illustrated in FIG. 3. Likewise, a light path 18 from light source 14, as shown in FIG. 2 can result in a bright region 17 in card image 15 of card 11 captured by camera 12, as illustrated in FIG. 3. The spacing between light source 13 and light source 14 (shown in FIG. 1) is optimized so that bright region 16 and bright region 17 in FIG. 3 are located far enough apart to allow for no overlap of bright regions.

Figure 4:
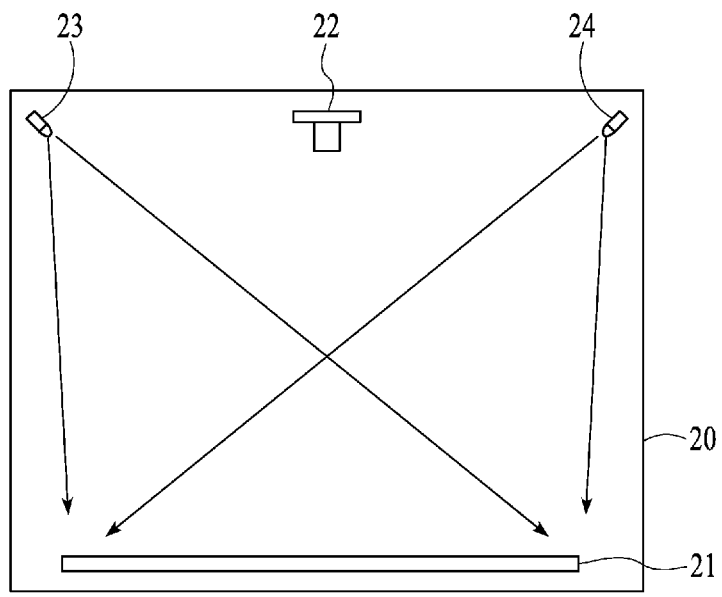
FIG. 4 and FIG. 5 illustrate how varying the locations of light sources can vary the locations of bright regions that can appear on images of cards with glossy surfaces.
Figure 5:
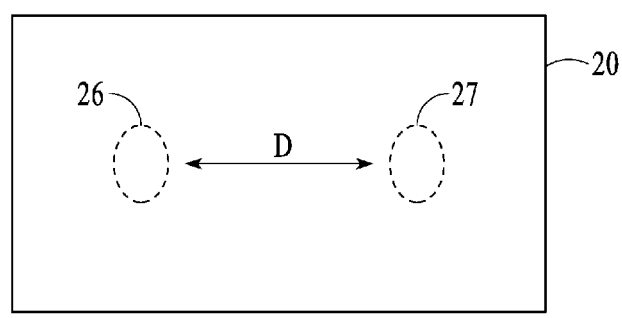

FIG. 4 and FIG. 5 illustrate how varying the locations of light sources can vary the locations and distance D between bright regions that can appear on images of cards with glossy surfaces. For example, light from a light source 23 reflected off a card 21 and captured as an image 20 by a camera 22 can result in a bright region 26 in image 20. Likewise, light from a light source 24 reflected off card 21 and captured as image 20 by a camera 22 can result in a bright region 27 in image 20.

Figure 6:
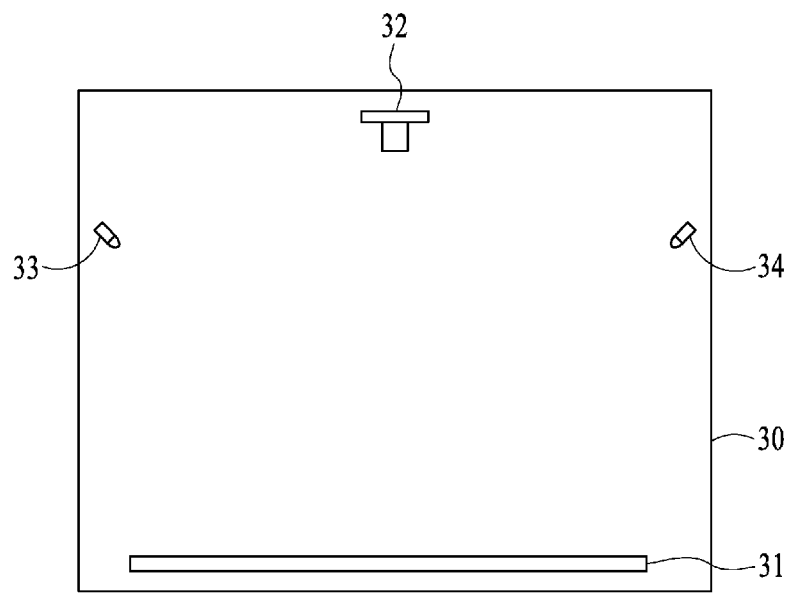
FIG. 6 and FIG. 7 illustrate how varying vertical distance of the locations of light sources can vary the locations of bright regions that can appear on images of cards with glossy surfaces.
Figure 7:
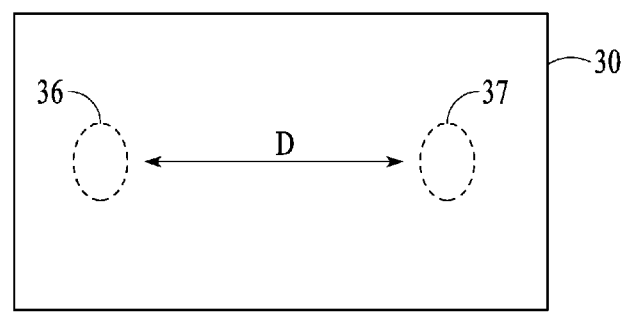

FIG. 6 and FIG. 7 illustrate how varying vertical distance of the locations of light sources can vary the locations and distance D between bright regions that can appear on images of cards with glossy surfaces. For example, light from a light source 33 reflected off a card 31 and captured as an image 30 by a camera 32 can result in a bright region 36 in image 30. Likewise, light from a light source 34 reflected off card 31 and captured as image 30 by a camera 32 can result in a bright region 37 in image 30.

Figure 8:
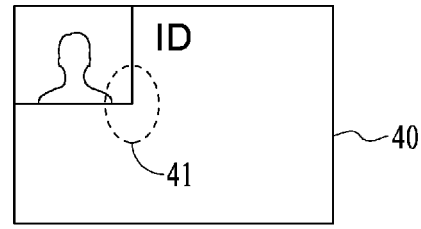
FIG. 8, FIG. 9 and FIG. 10 illustrate capturing images with one light source activated at a time and then removing bright regions using a pixel comparator process.
Figure 9:
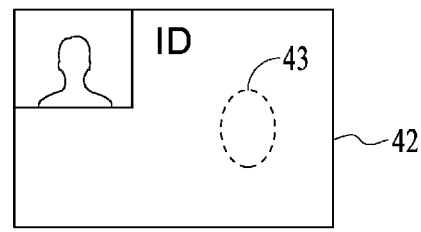
Figure 10:
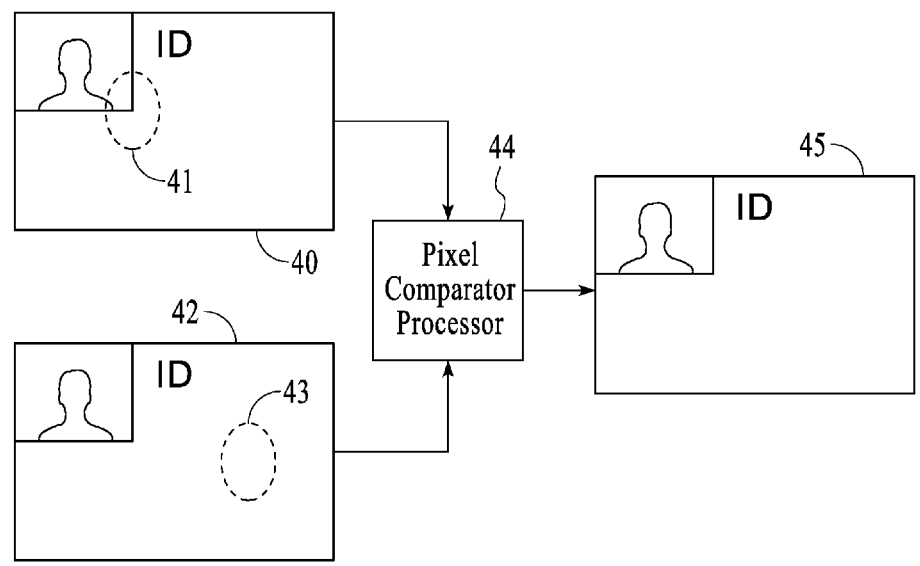

FIG. 8, FIG. 9 and FIG. 10 illustrate capturing images with one light source activated at a time and then removing bright regions using a pixel comparator process. FIG. 8 shows an image 40 captured with a first light source on and a second light source off resulting in a bright region 41 in image 40. FIG. 9 shows an image 42 captured with the first light source off and the second light source on resulting in a bright region 43 in image 42. FIG. 10 shows a pixel comparator 44 used to remove bright region 41 in image 40 and bright region 43 in image 42 to create a composite image 45 that has neither bright region 41 nor bright region 43.

Figure 11:
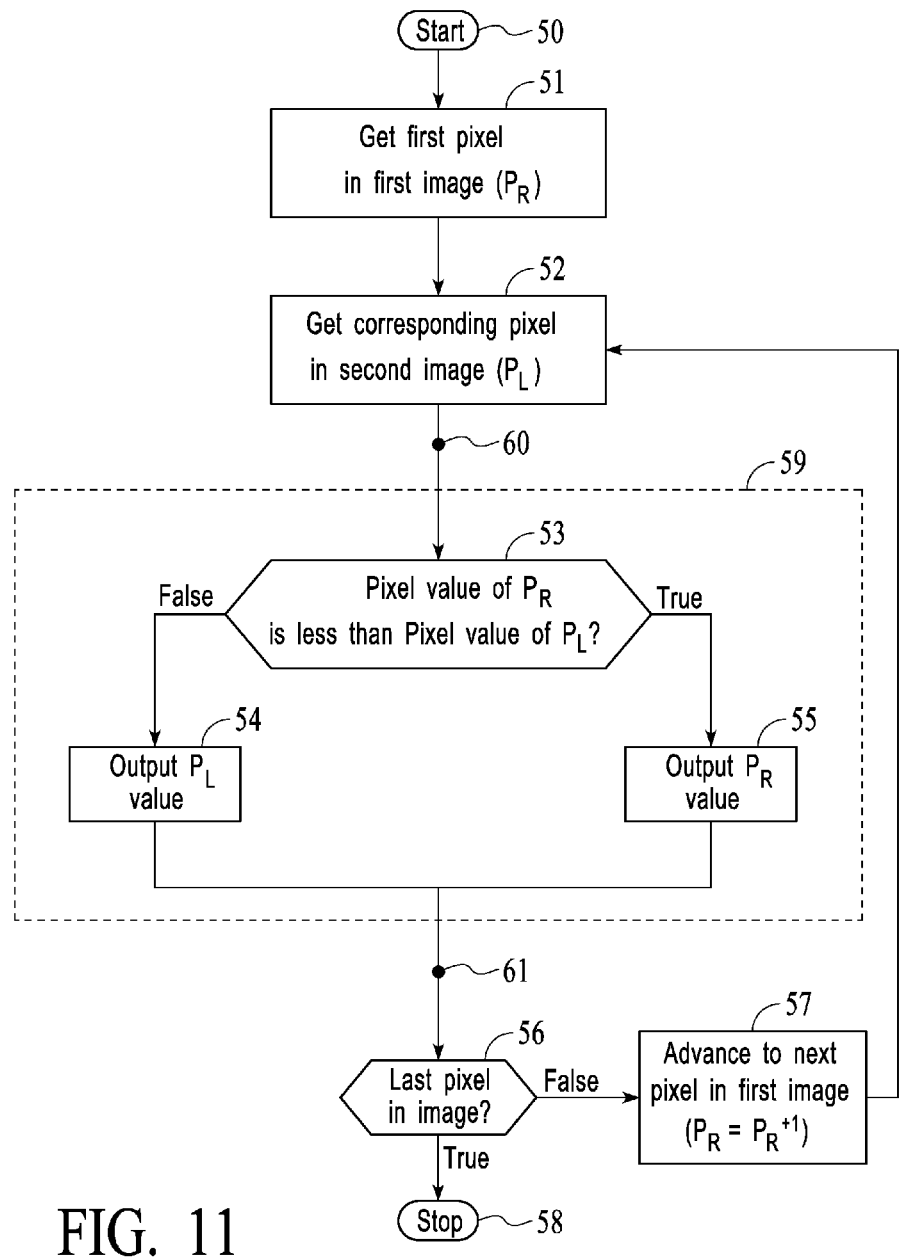
FIG. 11 shows a flowchart for operation of pixel comparator processor to remove bright regions.

FIG. 11 shows a flowchart for operation of pixel comparator processor 44 so as to remove bright region 41 and bright region 43. In a block 50, the process is started. In a block 51, a first pixel in image 40 is retrieved. In a block 52, a corresponding first pixel in image 42 is retrieved. In a block 53, if the brightness of pixel from of the retrieved pixel values are compared. If the pixel from image 40 is less than the value of the pixel from image 42, in a block 55, the pixel from image 40 is output to form the corresponding pixel of image 45. If the pixel from image 40 is not less than the value of the pixel from image 42, in a block 54, the pixel from image 42 is output to form the corresponding pixel of image 45.

In a block 56, a check is made to determine whether the pixel from image 40 is the last pixel in image 40. If not, in a block 57, a next pixel of image 40 is retrieved and blocks 52 through 55 are repeated. If in block 56 the pixel from image 40 is the last pixel in image 40, then in block 58 the process is completed. Some (minor) artifact may result due to uneven illumination from each light source. However, such an artifact is not significant, and can be significantly reduced by calibration using a white reference image.

Figure 12:
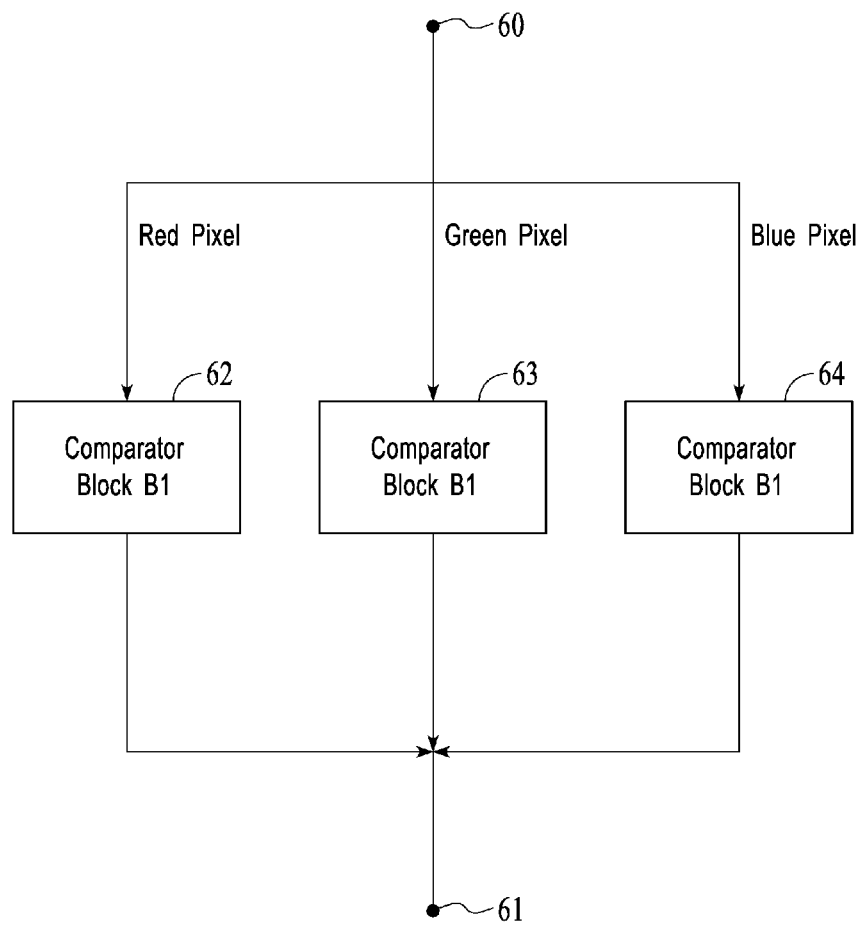
FIG. 12 shows an example of how different red, green and blue intensity values at each pixel location can be taken into account.

FIG. 12 shows an example of how the process can be modified to take into account different red, green and blue intensity values at each pixel location. Specifically, logic block 59 located between a node 60 and a node 61, as shown in FIG. 11, can be replaced by a comparator block 62, a comparator block 63 and a comparator block 64 as shown in FIG. 12.

Specifically for each pixel location, red intensity values of the pixel from image 40 and image 42 are compared by comparator block 62, and the lower intensity value is used for corresponding pixel in image 45. Green intensity values of the pixel from image 40 and image 42 are compared by comparator block 63, and the lower intensity value is used for corresponding pixel in image 45. Blue intensity values of the pixel from image 40 and image 42 are compared by comparator block 64, and the lower intensity value is used for corresponding pixel in image 45.

Figure 13:
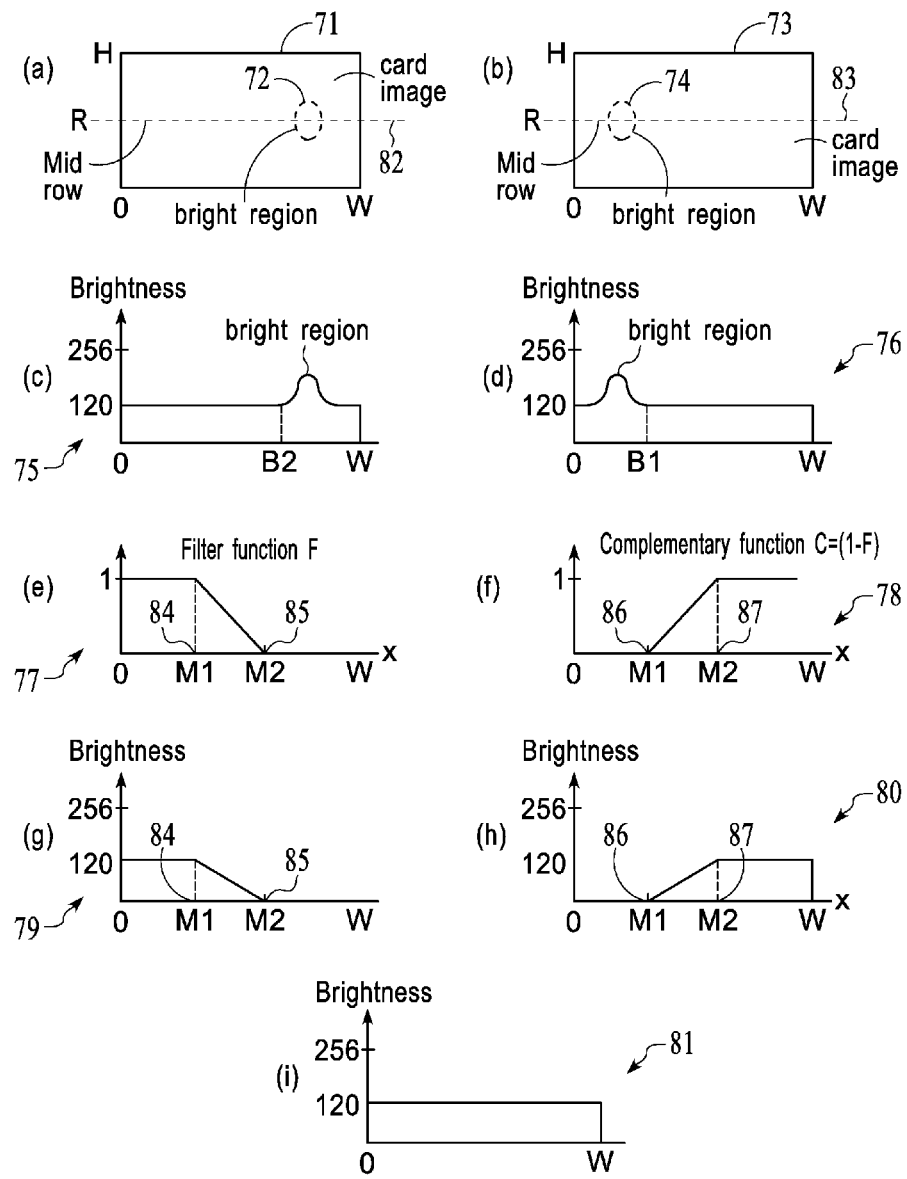
FIG. 13 and FIG. 14 illustrate use of spatial filtering and merging to remove bright regions from an image.
Figure 14:
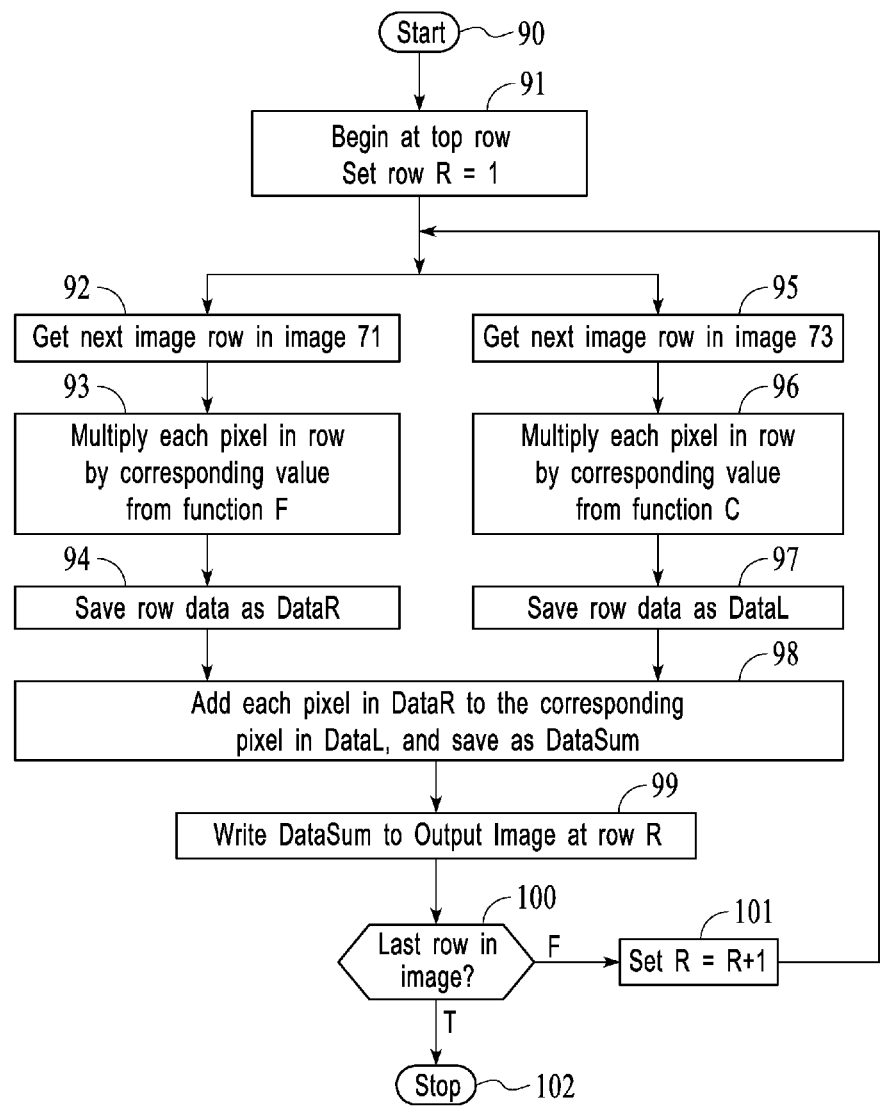

FIG. 13 and FIG. 14 illustrate use of spatial filtering and merging to remove bright regions from an image. In FIG. 13, an image 71 with a bright region 72 represents an image taken by camera 22 (shown in FIG. 4) with light source 24 on and light source 23 off. An image 73 with a bright region 74 represents an image taken by camera 22 (shown in FIG. 4) with light source 24 off and light source 23 on.

A graph 75 represents brightness level of image 71 along a row 82. A graph 76 represents brightness level of image 73 along a row 83. For example, brightness values for each color is in the range [0-255]. Average brightness level is 120, except for the bright regions.

A graph 77 represents an example filter function F used to filter image 71 before combining image 71 with image 73. Along row 82 of image 71, the full brightness level of image 71 is unfiltered until a location 84 in row 82. From a location 85 until the end of row 82, brightness level of image 71 is completely filtered. From location 84 until location 85 of row 82, the filtering level tapers, for example, in a straight line ramp.

A graph 78 represents an example filter function C used to filter image 73 before combining image 71 with image 73. Along row 83 of image 73, the brightness level of image 73 is completely filtered until a location 86 in row 83, From a location 87 until the end of row 83, the full brightness level of image 73 is unfiltered. From location 86 until location 87 of row 83, the filtering level increases, for example, in a straight line ramp. As can be seen from graph 77 and graph 78, the filter function C illustrated by graph 78 is a complement of the filter function F Illustrated by graph 77 so that $C=1-F$.

A graph 79 represents the filtered brightness level achieved by applying the filter represented in graph 77 to the brightness level of the pixels along row 82 of image 71. The full brightness level of image 71 is unfiltered until location 84 in row 82. From a location 85 until the end of row 82, brightness level of image 71 is completely filtered. From location 84 until location 85 of row 82, the filtering level tapers in a straight line ramp.

A graph 80 represents the filtered brightness level achieved by applying the filter represented in graph 78 to the brightness level of the pixels along row 83 of image 73. Along row 83 of image filter 73, the brightness level of image 73 is completely filtered until a location 86 in row 83. From a location 87 until the end of row 83, the full brightness level of image 73 is unfiltered. From location 86 until location 87 of row 83, the filtering level increases in a straight line ramp.

As is clear from the graphs shown in FIG. 13, in a first area represented as 0 to M1, pixels of image 71 are used to produce a corresponding first area of the resulting combined image. In a second area represented as M2 to W, pixels of the image 73 are used to produce a corresponding second area of the resulting combined image. In a third area represented as M1 to M2, brightness of pixels in image 71 is filtered using the filter function F and brightness of pixels in image 73 is filtered using the filter function C, which is a complement of the filter function F so that $C=1-F$. The resulting brightness level at each pixel in the third area for image 71 and image 73 are added to produce a corresponding area of the resulting combined image.

FIG. 14 shows a flowchart for using a spatial filter to remove bright region 72 of image 71 and bright region 74 of image 73 to form an output image without bright regions. In a block 90, the process is started. In a block 91, the process is initialized to a top (row R=1) of image 71 and image 73. In a block 92 image row R is obtained for image 71. In a parallel block 95, image row R is obtained for image 73.

In a block 93, each pixel of image 71 in row R, is multiplied by the value at the corresponding image location in the filter function for image 71. In a parallel block 96, each pixel of image 73 in row R, is multiplied by the value at the corresponding image location in the filter function for image 73. In a block 94, the filtered brightness values of row R of image 71 are saved. In a parallel block 97, the filtered brightness values of row R of image 73 are saved.

In a block 98, the saved filtered brightness value for each pixel in image 71 is added to the corresponding saved filtered brightness value for the pixel in image 73. In a block 99, the result is used to create the corresponding row of the output image.

In a block 100, a check is made to determine whether row R is the last row in image 71 and image 73. If not, in a block 101, the row is incremented (R=R+1) and the process returns to block 92 and block 95. If in block 101 row R is the last row in image 71 and image 73, then in block 102 the process is completed.

Figure 15:
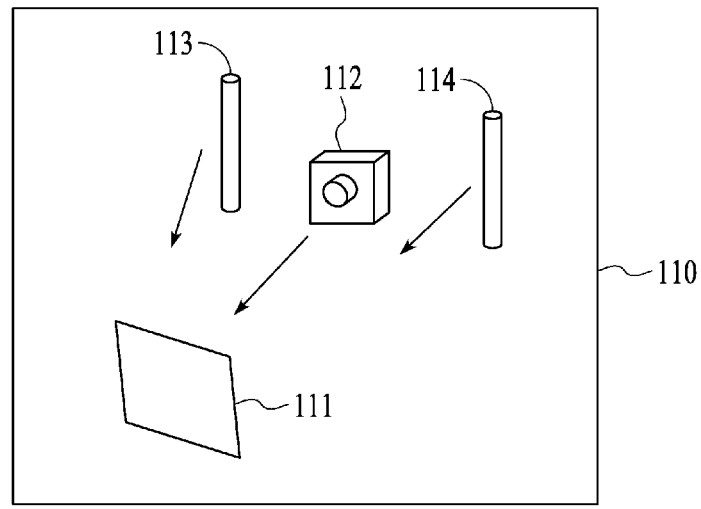
FIG. 15 is a simplified diagram illustrating an image capture setup.

FIG. 15 is a simplified diagram illustrating an image capture setup. A cameral housing 110 includes a camera 112 used to capture an image of a card 111. Lighting is provided by a light source 113 and a light source 114. For example, each of light source 13 and light source 14 is an extended light source that can create an elongated bright region.

The lighting set up shown in FIG. 15 can be effectively used for capturing images of cards with non-glossy surfaces, such as business cards and other similar cards, for example, printed on non-reflective card stock material.

Figure 16:
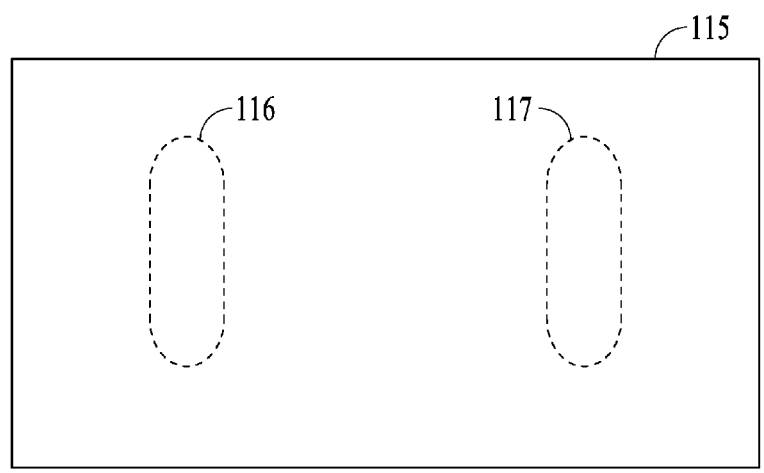
FIG. 16 illustrate elongated bright regions that can appear on images of cards with glossy surfaces when using the lighting set up show in FIG. 15.

FIG. 16 illustrate elongated bright regions that can appear on images of cards with glossy surfaces when using the lighting set up show in FIG. 15. Particularly a light path from light source 113 can result in a bright region 116 in a card image 115 of card 111 captured by camera 112, as illustrated in FIG. 16. Likewise, a light path from light source 114 can result in a bright region 117 in card image 115 of card 111 captured by camera 112, as also illustrated in FIG. 16.

Figure 17:
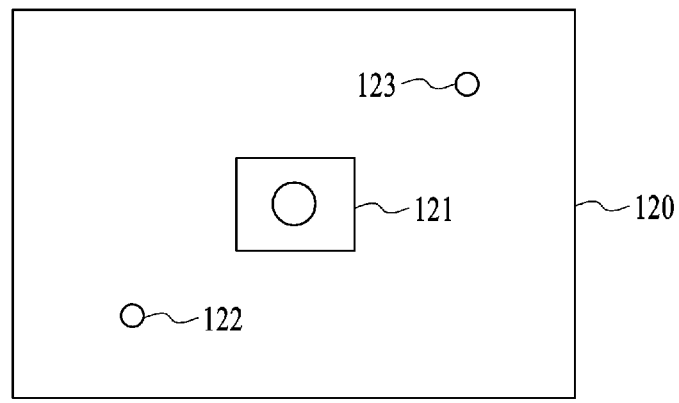
FIG. 17 is a simplified diagram illustrating an image capture setup.

Different light configurations may be used. For example, FIG. 17 is a simplified diagram illustrating an image capture setup. A cameral housing 120 includes a camera 121 used to capture an image of a card. Lighting is provided by a light source 123 and a light source 124 at opposite corners of cameral housing 120. For example, each of light source 123 and light source 124 is composed of one or more LEDs in a selected configuration.

Figure 18:
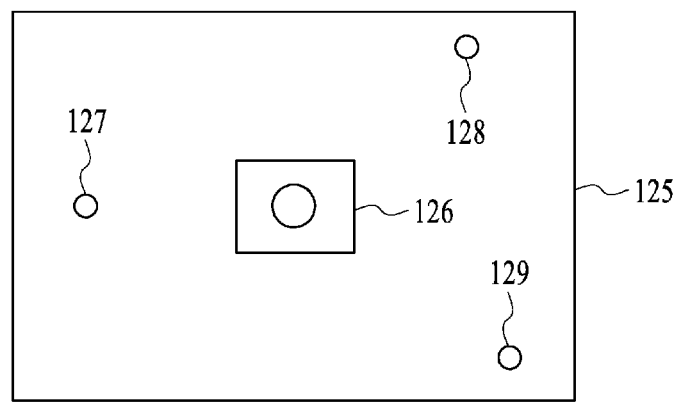
FIG. 18 is a simplified diagram illustrating another image capture setup.

In another example shown in FIG. 18, a cameral housing 125 includes a camera 126 used to capture an image of a card. Lighting is provided by a light source 127, a light source 128 and a light source 129 variously located within cameral housing 125. For example, each of light source 127, light source 128 and light source 129 is composed of one or more LEDs in a selected configuration.

Figure 19:
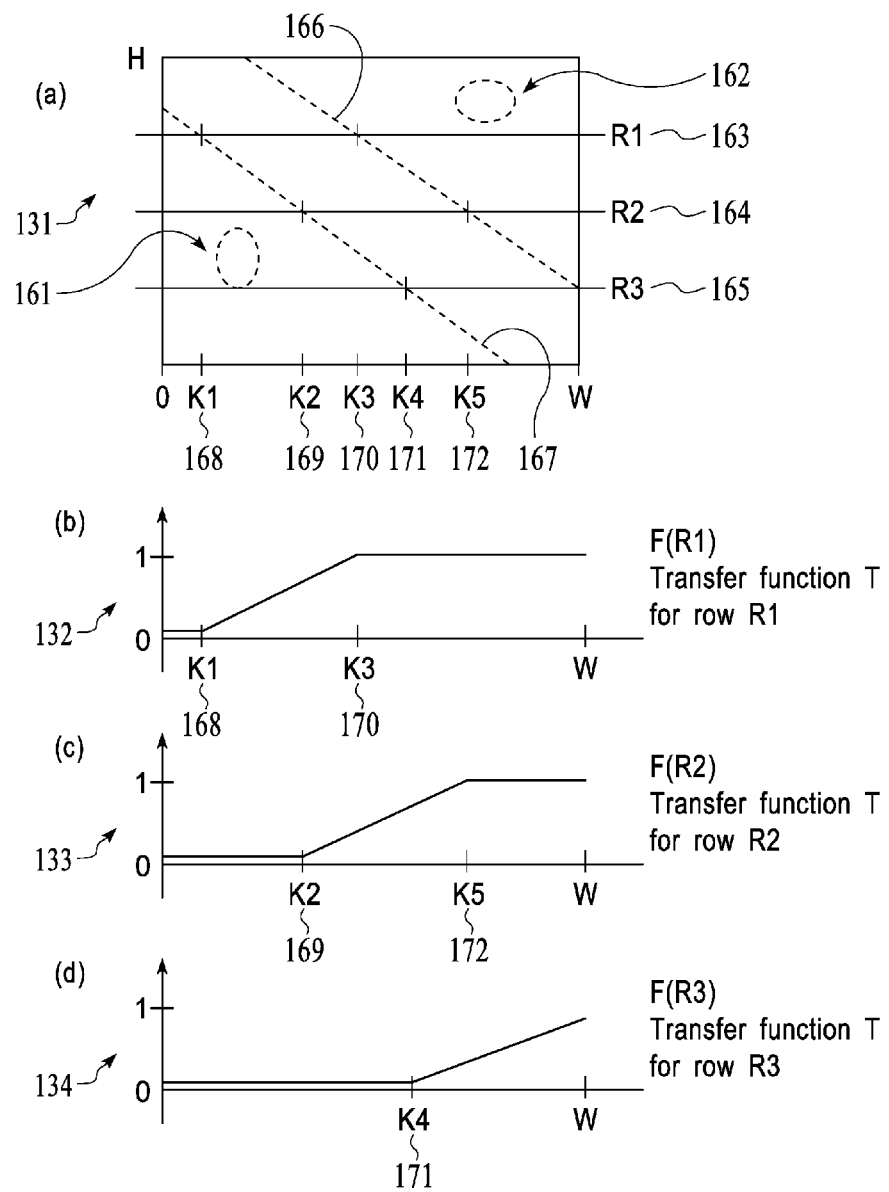
FIG. 19 and FIG. 20 illustrate use of spatial filtering to account for two light sources located in diagonally opposite corners of a camera housing, such as is shown in FIG. 17.
Figure 20:
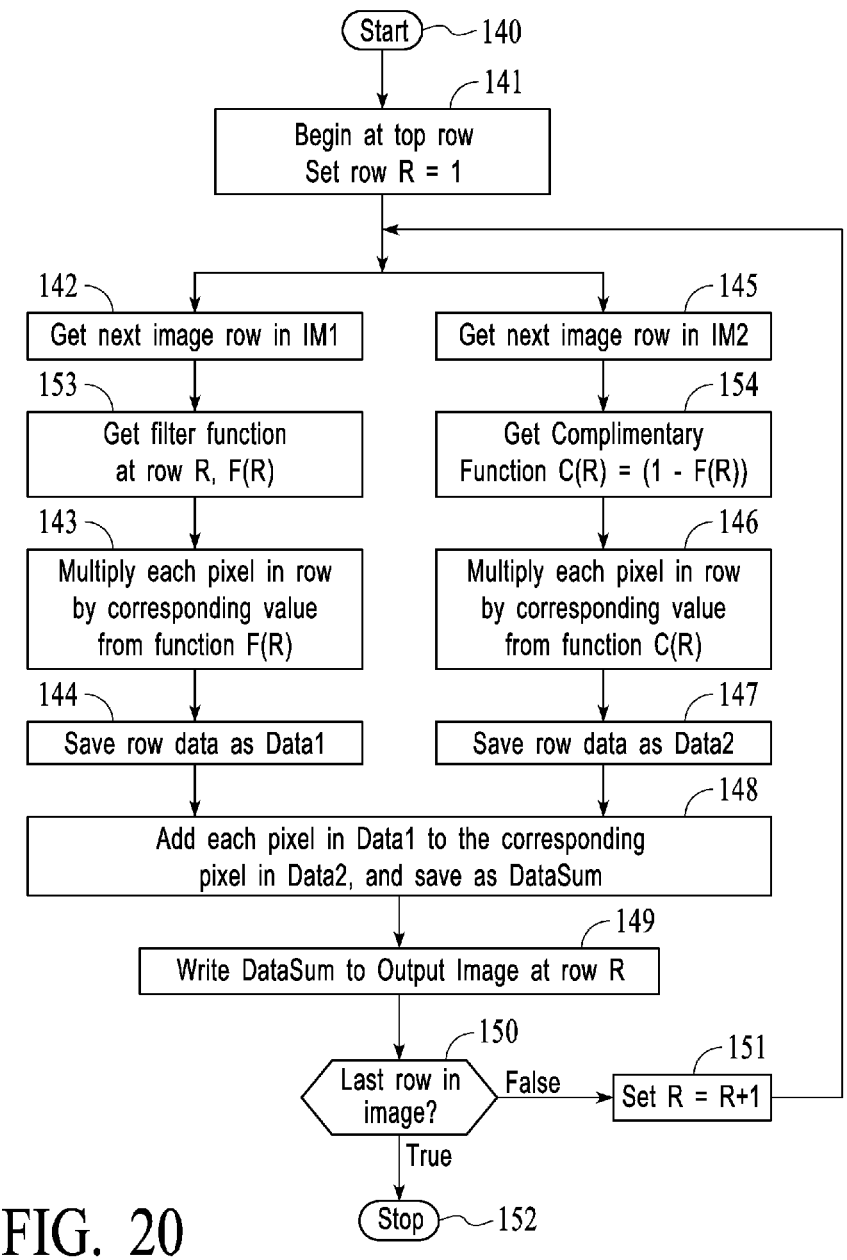

FIG. 19 and FIG. 20 illustrate use of spatial filtering to account for two light sources located in diagonally opposite corners of a camera housing, such as is illustrated in FIG. 17. In FIG. 19, a card representation 131 has an area 161 outlined that represents when an image taken by camera 121 (shown in FIG. 17) with light source 122 on and light source 123 off will have a bright region. Card representation 131 also has an area 162 outlined that represents when an image taken by camera 121 (shown in FIG. 17) with light source 122 off and light source 123 on will have a bright region.

A filter function used when an image is taken by camera 121 (shown in FIG. 17) with light source 122 on and light source 123 off will fully filter the image from the left edge of card representation 131 until a diagonal 167, perform no filtering from diagonal 166 until the right edge of card representation and will partially filter, for example using a ramp filter, from diagonal 167 to diagonal 166.

A filter function used when an image is taken by camera 121 (shown in FIG. 17) with light source 122 off and light source 123 on will fully filter the image from the right edge of card representation 131 until diagonal 166, perform no filtering from diagonal 167 until the left edge of card representation and will partially filter, for example using a ramp filter, from diagonal 166 to diagonal 167.

For the above described filter function, a graph 132 represents an example filter function used for a row 163 of card representation 131 for an image taken by camera 121 (shown in FIG. 17) with light source 122 on and light source 123 off. The filter function will fully filter the image from the left edge of card representation 131 until a location 168, where a diagonal 167 crosses row 163, will perform no filtering from a location 170 where diagonal 166 crosses row 163 until the right edge of card representation 131 and will partially filter using a ramp filter, from location 168 to location 170.

For the above described filter function, a graph 133 represents an example filter function used for a row 164 of card representation 131 for an image taken by camera 121 (shown in FIG. 17) with light source 122 on and light source 123 off. The filter function will fully filter the image from the left edge of card representation 131 until a location 169, where a diagonal 167 crosses row 164, will perform no filtering from a location 172 where diagonal 166 crosses row 164 until the right edge of card representation 131 and will partially filter using a ramp filter, from location 169 to location 172.

For the above described filter function, a graph 134 represents an example filter function used for a row 165 of card representation 131 for an image taken by camera 121 (shown in FIG. 17) with light source 122 on and light source 123 off. The filter function will fully filter the image from the left edge of card representation 131 until a location 171, where a diagonal 167 crosses row 165, and will partially filter using a ramp filter, from location 171 to until the right edge of card representation 131.

FIG. 20 shows a flowchart for using a spatial filter to remove bright regions for the spatial filter function illustrated in FIG. 19. In a block 140, the process is started. In a block 141, the process is initialized to a top (row R=1) of card representation 131. In a block 142 image row R is obtained for a first image (IM1) obtained with light source 122 on and light source 123 off. In a parallel block 145, image row R is obtained for a second image (IM2) obtained with light source 122 off and light source 123 on.

In a block 153, a first filter function used to filter row R for the first image is retrieved. In a parallel block 154, a second filter function used to filter row R for the second image is retrieved.

In a block 143, each pixel of the first image in row R, is multiplied by the values at the corresponding location in the first filter function for row R. In a parallel block 146, each pixel of the second image in row R, is multiplied by the values at the corresponding image location in the second filter function for Row R. In a block 144, the filtered brightness values of row R of the first image are saved. In a parallel block 147, the filtered brightness values of row R of the second image are saved.

In a block 148, the saved filtered brightness value for each pixel in the first image is added to the corresponding saved filtered brightness value for the pixel in the second image. In a block 149, the result is used to create the corresponding row of the output image.

In a block 150, a check is made to determine whether row R is the last row in the first image and the second image. If not, in a block 151, the row is incremented (R=R+1) and the process returns to block 142 and block 145. If in block 151 row R is the last row in the first image and second image, then in block 152 the process is completed.

Figure 21:
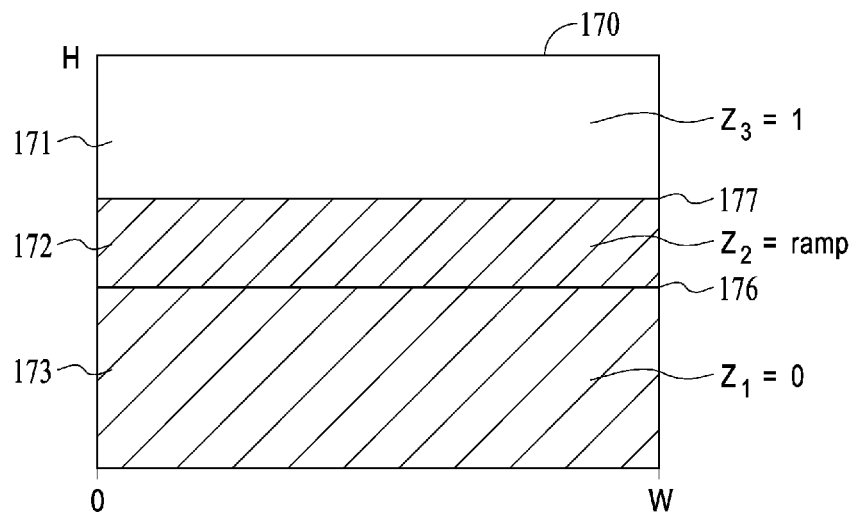
FIG. 21 illustrate use of spatial filtering to account for two light sources that produce bright regions at different vertical locations of a captured image.

FIG. 21 illustrate use of spatial filtering to account for two light sources that produce bright regions at different vertical locations of a captured image. In FIG. 21, a card representation 170 has an area 171 outlined that represents when an image taken by a camera with the first light source on and the second light source off will have a bright region. Card representation 170 also has an area 173 outlined that represents when an image taken by camera 121 (shown in FIG. 17) with the first light source off and the second light source on will have a bright region. An area 172 lies between area 171 and area 173.

A filter function used when an image is taken by the camera with the first light source on and the second light source off will fully filter the image from the top side of card representation 170 until a horizontal line 177, perform no filtering from a horizontal line 176 until the bottom edge of card representation and will partially filter, for example using a ramp filter, from horizontal line 177 to horizontal line 176.

A filter function used when an image is taken by the camera with the first light source off and the second light source on will fully filter the image from the bottom edge of card representation 170 until horizontal line 176, perform no filtering from horizontal line 177 until the top edge of card representation and will partially filter, for example using a ramp filter, from horizontal line 176 to horizontal line 177.

Figure 22:
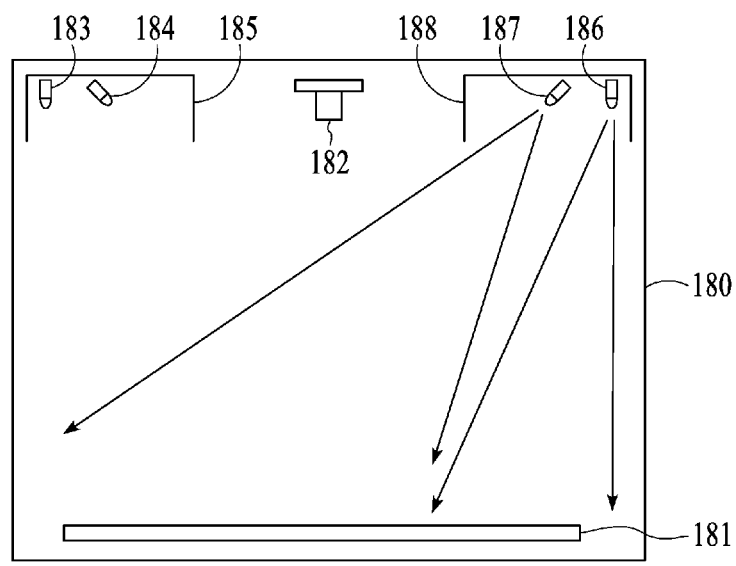
FIG. 22 is a simplified diagram illustrating another image capture setup illustrating how an opaque light box can be used to reduce reflections.

FIG. 22 is a simplified diagram illustrating another image capture setup illustrating how an opaque light box can be used to reduce reflections. A camera housing 180 includes a camera 182 used to capture an image of a card 181. Lighting is provided by a light source 183, a light source 184, a light source 186 and a light source 187, each of which, for example is a light emitting diode (LED). An opaque box structure 185 reduces reflection from light originating from light source 183 and 184. An opaque box structure 188 reduces reflection from light originating from light source 186 and 187. Use of an opaque light boxes constrain the light from the LEDs, and greatly reduces the amount of reflection from the back of the camera housing. Each opaque box structure uses, for example, two LEDs to facilitate better lighting across the whole width of the card. LEDs have limited lighting spread. One LED is directed at the region directly to the front of the light box. The second LED is directed towards the far end of the card. This promotes better lighting over the whole surface of the card.

It is difficult to light the surface of the document uniformly, even with the use of multiple LEDs. Uneven lighting on the document surface results in bright and dark regions in the captured images. This can be compensated by a post image capture process. One method of calibration is as follows:

First, an image of a white card is captured and used as the reference image for calibration. The reference image will contain bright and dark regions because of the uneven lighting of the document surface.

Second, a target brightness level (BT) is chosen. For 8-bit pixel images, the value of BT can typically be any value from 200-255. The value of BT can also be set to the average brightness value of the reference image.

Third, for each pixel location in the reference image, a multiplier factor (MF) that converts the pixel value of the reference image to the BT value, where MF=(BT/Pixel Value). Each pixel location will have its own multiplier value. For color images, there are three multiplier values at each pixel, corresponding to the red, green, and blue pixel values.

Fourth, the array of MF values for each pixel location serves as the Calibration Template, and is saved.

Fifth, when a raw image of the document is captured, each pixel in the raw image is multiplied with the corresponding MF value from the saved Calibration Template. Any pixel value above the max of 255 is truncated to 255. This results in a calibrated image.

Figure 23:
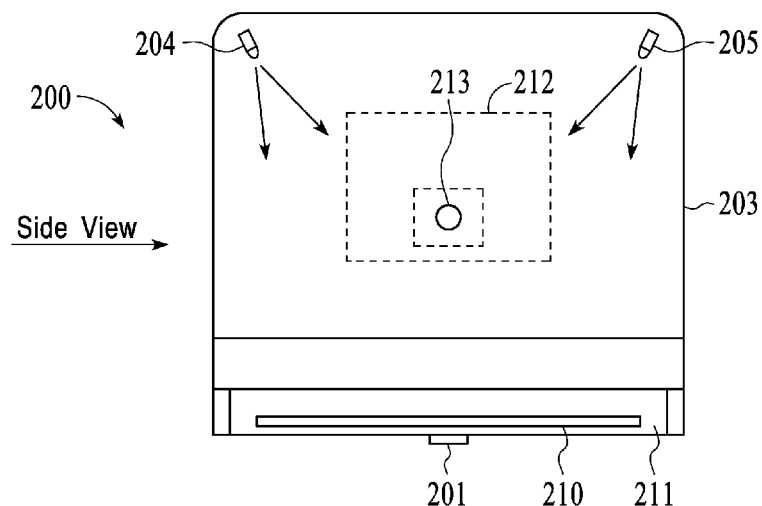
FIG. 23 is a simplified front view of a card reader.

FIG. 23 is a simplified front view of a card reader 200 that includes a camera 213, a mirror 212, a document input tray 211, a card reader housing 203 and a document sensor 201. A document 210 is placed on document input tray 211 allowing camera 213 to capture an image of an upward facing surface of document 210. For example, document 210 is a card such as a business card, a driver's license, an insurance identification card or another form of identification card. Document 210, for example, may be laminated or otherwise coated to aid in preserving information displayed by document 210.

For example, mirror 212 is a front surface mirror (also known as a first surface mirror) where light reflects off the front surface of mirror glass, rather than reflecting off the back surface of the glass. For example, mirror 212 has silver coated on the front surface of mirror 212 to cause light to reflect from the front surface of the mirror glass. Placement and orientation of camera 213 is chosen to capture light from document 210 as reflected by mirror 212.

For example, a light source 204 and a light source 205 are placed within card reader housing so as to shine direct light upon document 210. The locations of light source 204 and a light source 205 are selected so that resulting bright regions from each of light source 204 and light source 205 occur at different locations of document 210. This facilitates capturing images with one light source activated at a time and then removing bright regions as described above, for example, using a pixel comparator process, a spatial filtering process or another filtering process.

Figure 24:
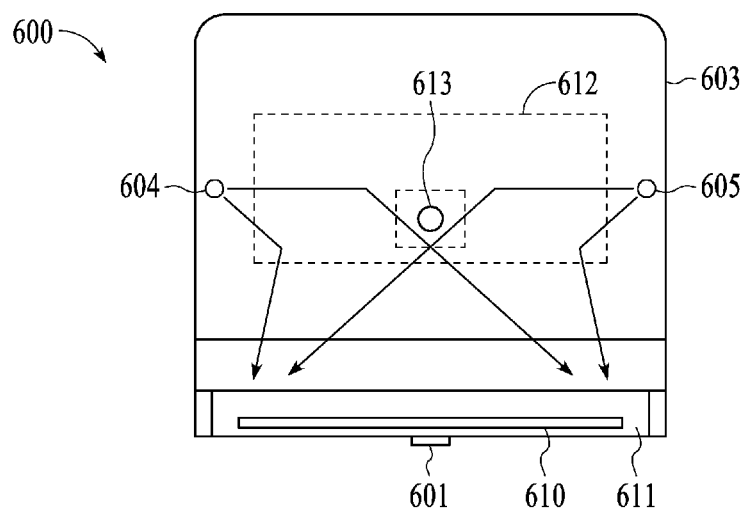
FIG. 24 and FIG. 25 show various simplified views of another card reader.
Figure 25:
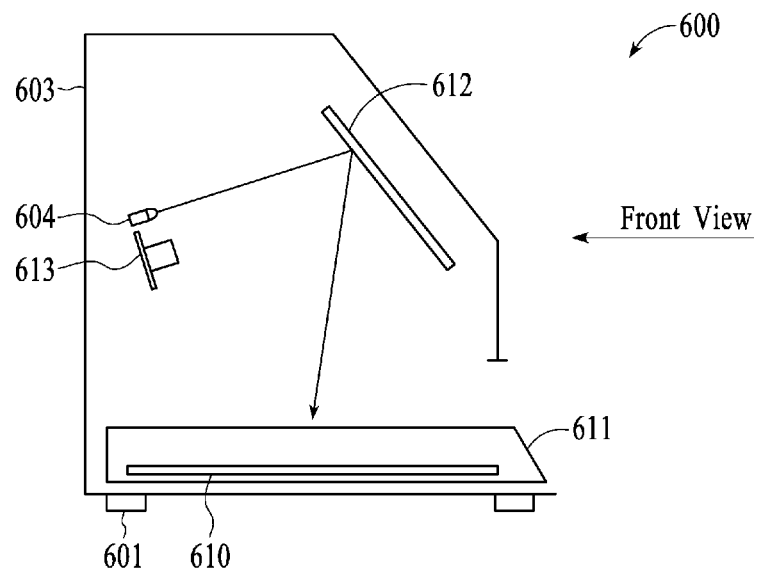

FIG. 24 is a simplified front view of a card reader 600. FIG. 25 is a simplified side view of card reader 600. Card reader 600 includes a camera 613, a mirror 612, a document input tray 611, a card reader housing 603 and a document sensor 601. A document 610 is placed on document input tray 611 allowing camera 613 to capture an image of an upward facing surface of document 610. For example, document 610 is a card such as a business card, a driver's license, an insurance identification card or another form of identification card. Document 610, for example, may be laminated or otherwise coated to aid in preserving information displayed by document 610.

For example, mirror 612 is a front surface mirror (also known as a first surface mirror) where light reflects off the front surface of mirror glass, rather than reflecting off the back surface of the glass. For example, mirror 612 has silver coated on the front surface of mirror 612 to cause light to reflect from the front surface of the mirror glass. Placement and orientation of camera 613 is chosen to capture light from document 610 as reflected by mirror 612.

For example, a light source 604 and a light source 605 are placed within card reader housing so as to provide light upon document 610 that is reflected from mirror 612. The locations of light source 604 and light source 605 are selected so that resulting bright regions from each of light source 604 and light source 605 reflected by mirror 612, occur at different locations of document 610. This facilitates capturing images with one light source activated at a time and then removing bright regions as described above, for example, using a pixel comparator process, a spatial filtering process or another filtering process.

Figure 26:
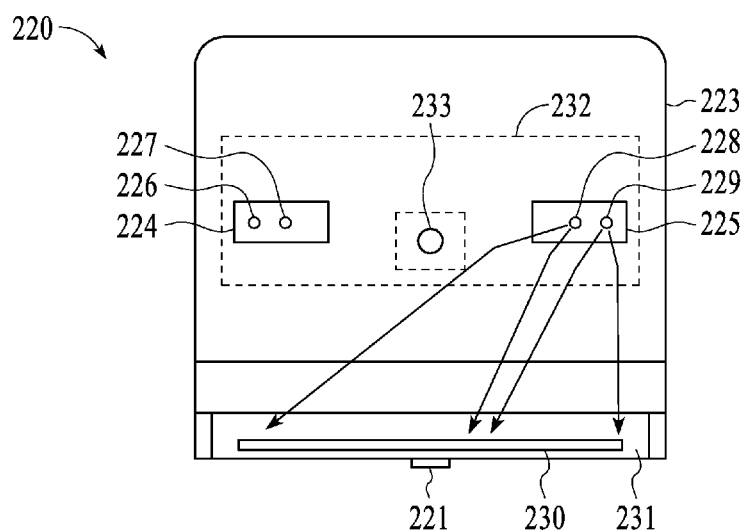
FIG. 26 is a simplified front view a card reader.

In the embodiment shown in FIG. 24 and FIG. 25, light source 604 and light source 605 may be replaced by light boxes. This is illustrated by FIG. 26. FIG. 26 is a simplified front view of a card reader 220 that includes a camera 233, a mirror 232, a document input tray 231, a card reader housing 223 and a document sensor 221. A document 230 is placed on document input tray 231 allowing camera 233 to capture an image of an upward facing surface of document 230. For example, document 230 is a card such as a business card, a driver's license, an insurance identification card or another form of identification card. Document 230, for example, may be laminated or otherwise coated to aid in preserving information displayed by document 230.

For example, mirror 232 is a front surface mirror (also known as a first surface mirror) where light reflects of the front surface of mirror glass, rather than reflecting off the back surface of the glass. For example, mirror 232 has silver coated on the front surface of mirror 232 to cause light to reflect from the front surface of the mirror glass. Placement and orientation of camera 233 is chosen to capture light from document 230 as reflected by mirror 232.

For example, a light source 224 and a light source 225 are placed within card reader housing at locations so as to provide light upon document 230 that is reflected from mirror 232. The locations of light source 224 and light source 225 configured so that resulting bright regions from each of light source 225 and light source 225 occur at different locations of document 230. This facilitates capturing images with one light source activated at a time and then removing bright regions as described above, for example, using a pixel comparator process, a spatial filtering process or another filtering process. For example, light source 224 is a light box that includes an LED 226 and an LED 227. For example, light source 225 is a light box that includes an LED 228 and an LED 229.

Figure 27:
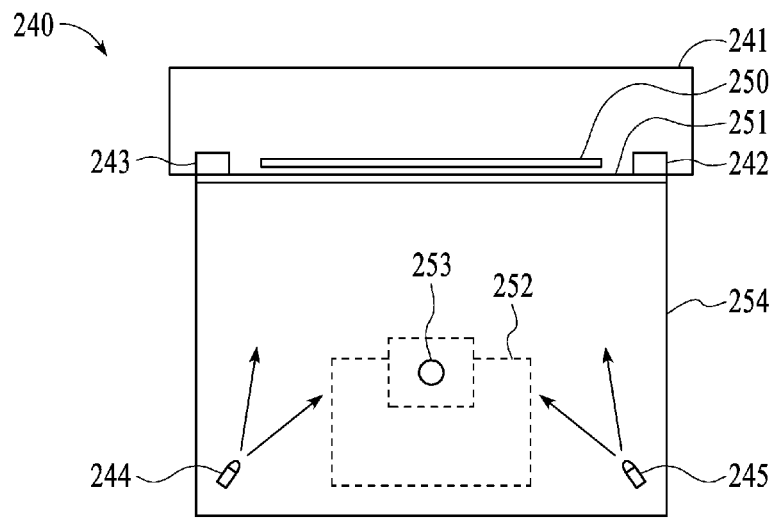
FIG. 27 shows a simplified front view of a card reader.

FIG. 27 shows a simplified front view of a card reader 240 that includes a camera 253, a mirror 252 and card reader housing 254. A glass top 251 is used to isolate camera 253 and mirror 252 from external elements such as dirt and dust. For example, glass top 251, is composed of glass that has anti-reflective coated on one or both sides to reduce the amount of surface reflection that can produce glare on a captured image.

For example, a light source 244 and a light source 245 are placed within card reader housing at locations configured to provide direct lighting to a document 250 so that resulting bright regions from each of light source 244 and light source 245 occur at different locations of document 250. This facilitates capturing images with one light source activated at a time and then removing bright regions as described above, for example, using a pixel comparator process, a spatial filtering process or another filtering process.

A flat lid 241 is mounted on a hinge 242 and a hinge 243. Hinge 242 and hinge 243 are configured to allow lid 241 to swing open to receive document onto the glass top 251. Lid 241 serves to reduce ambient lighting and background.

Figure 28:
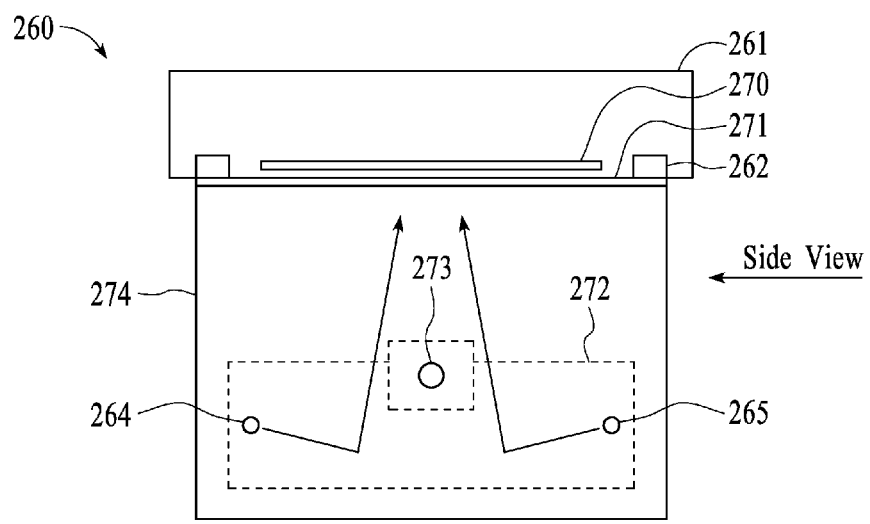
FIG. 28 shows a simplified front view and FIG. 29 shows a simplified side view of a card reader.
Figure 29:
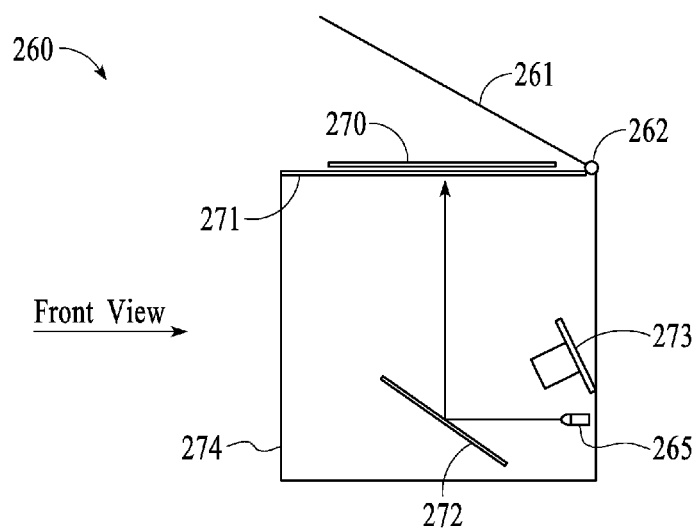

FIG. 28 shows a simplified front view and FIG. 29 shows a simplified side view of a card reader 260 that includes a camera 273, a mirror 272 and card reader housing 274. A glass top 271 is used to isolate camera 273 and mirror 272 from external elements such as dirt and dust. For example, glass top 271, is composed of glass that has anti-reflective coated on one or both sides to reduce the amount of surface reflection that can produce glare on a captured image.

For example, a light source 264 and a light source 265 are placed within card reader housing at locations configured so that resulting bright regions from light reflected off mirror 272 from each of light source 264 and light source 265 occur at different locations of a document 270. This facilitates capturing images with one light source activated at a time and then removing bright regions as described above, for example, using a pixel comparator process, a spatial filtering process or another filtering process.

A lid 261 mounted on a hinge 262 covers the glass top area serves to reduce ambient lighting and background. In place of a flat lid, an umbrella-like curved canopy can be used to shield from light and background from above the scanner. The canopy can be fixed to one side of the scanner housing, for example on the side of hinge location 262. The other side of the canopy is open to allow insertion and extraction of the card from the glass top. This is illustrated in the embodiment shown in FIG. 55 below.

A similar card reader can also be implemented without a lid since a document is lighted from inside and the whole glass surface can be considered as the region of interest for image capture. If the card surface is in contrast to the image background (with or without lid), the card can be further segmented from the captured image using edge detection methods.

Figure 30:
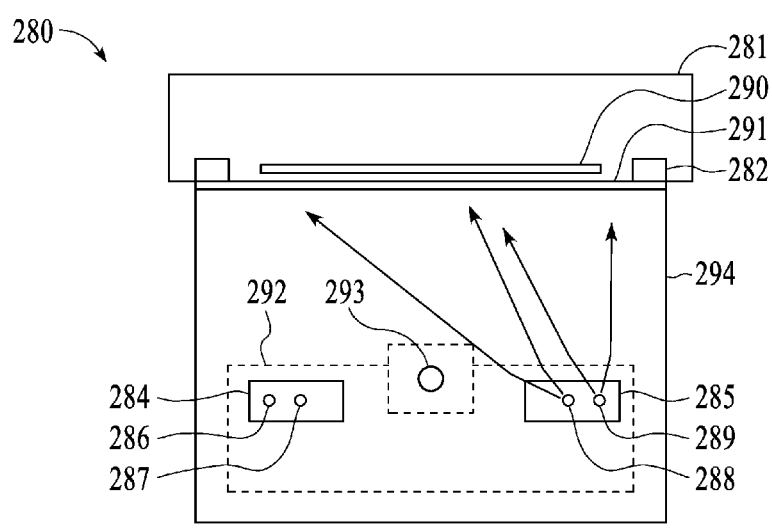
FIG. 30 shows a simplified front view of a card reader.

FIG. 30 shows a simplified front view of a card reader 280 that includes a camera 293, a mirror 292 and card reader housing 294. A glass top 291 is used to isolate camera 293 and mirror 292 from external elements such as dirt and dust. For example, glass top 291, is composed of glass that has anti-reflective coated on one or both sides to reduce the amount of surface reflection that can produce glare on a captured image.

For example, a light source 284 and a light source 285 are placed within card reader housing at locations configured so that resulting bright regions from light reflected off mirror 292 from each of light source 284 and light source 285 occur at different locations of a document 290. This facilitates capturing images with one light source activated at a time and then removing bright regions as described above, for example, using a pixel comparator process, a spatial filtering process or another filtering process.

For example, light source 284 is a light box that includes an LED 286 and an LED 287. For example, light source 285 is a light box that includes an LED 288 and an LED 289.

Figure 31:
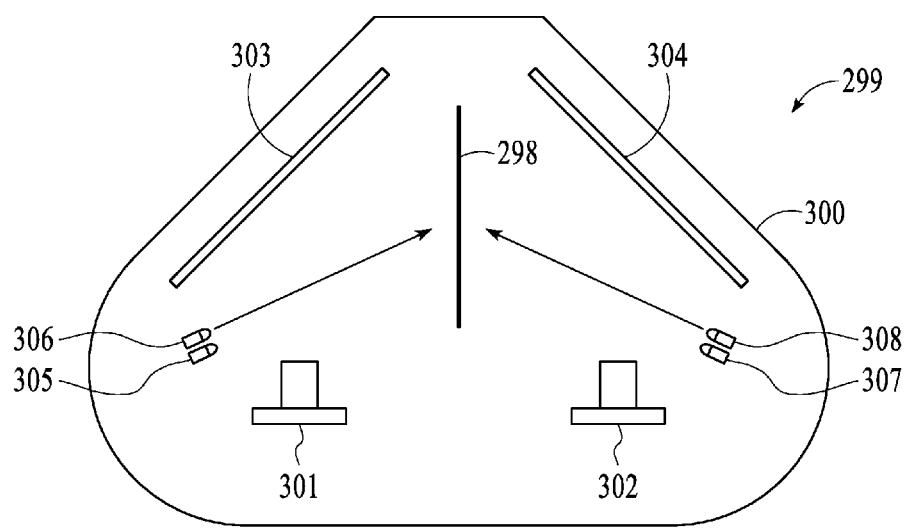
FIG. 31 shows a simplified top view and FIG. 32 shows a simplified side view of a duplex card scanner.
Figure 32:
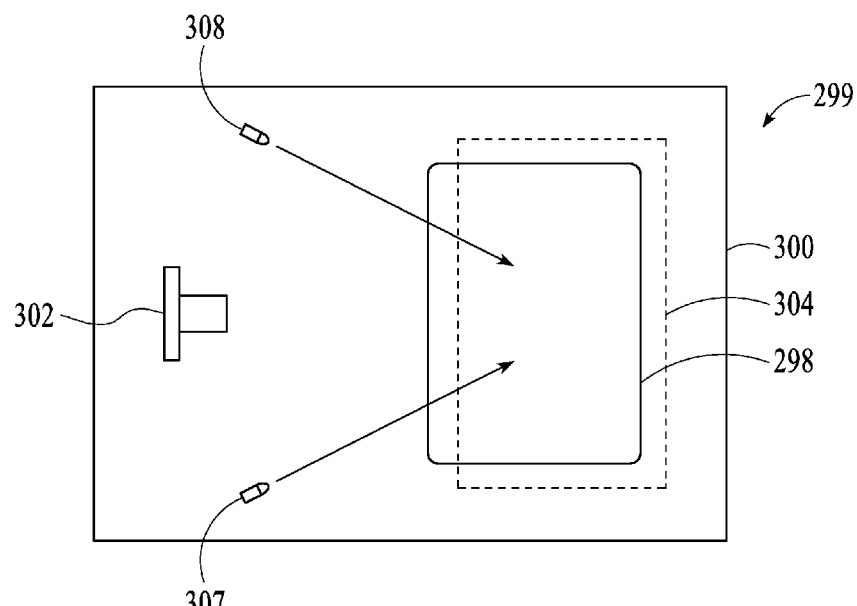

FIG. 31 shows a simplified top view and FIG. 32 shows a simplified side view of a duplex card scanner 299 that uses a camera 301 and a camera 302 within a scanner housing 300. A card 298 is positioned between a mirror 303 and a mirror 304 oriented as shown. Camera 301 captures an image that includes a first side of card 298. Camera 302 captures an image that includes a second side of card 298. Illumination for the first side of card 298 is provided by direct lighting from a light source 305 and a light source 306. For example, light source 305 and a light source 306 are placed within scanner housing 300 at locations configured so that resulting bright regions from each of light source 305 and light source 306 occur at different locations of the first side of card 298. This facilitates capturing images with one light source activated at a time and then removing bright regions as described above, for example, using a pixel comparator process, a spatial filtering process or another filtering process, as discussed above.

Illumination for the second side of card 298 is provided by direct lighting from a light source 307 and a light source 308. For example, light source 307 and a light source 308 are placed within scanner housing 300 at locations configured so that resulting bright regions from each of light source 307 and light source 308 occur at different locations of the second side of card 298. This facilitates capturing images with one light source activated at a time and then removing bright regions as described above, for example, using a pixel comparator process, a spatial filtering process or another filtering process, as discussed above.

Figure 33:
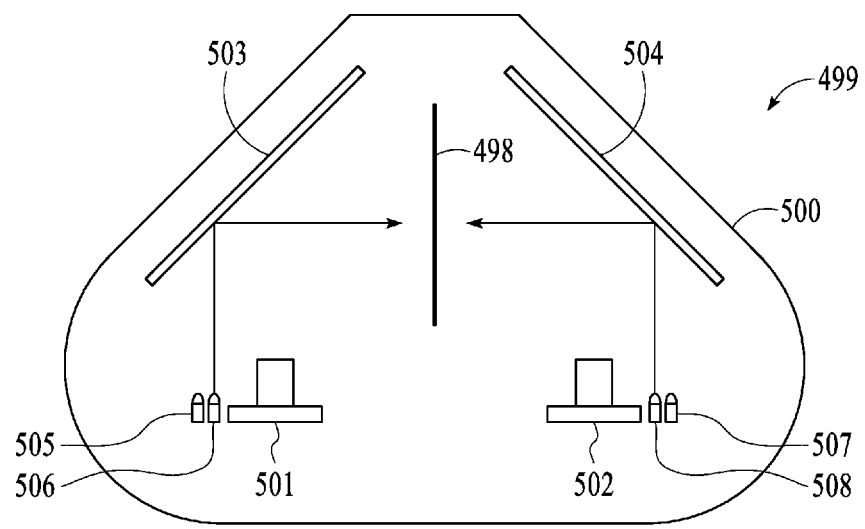
FIG. 33 shows a simplified top view and FIG. 34 shows a simplified side view of a duplex card scanner.
Figure 34:
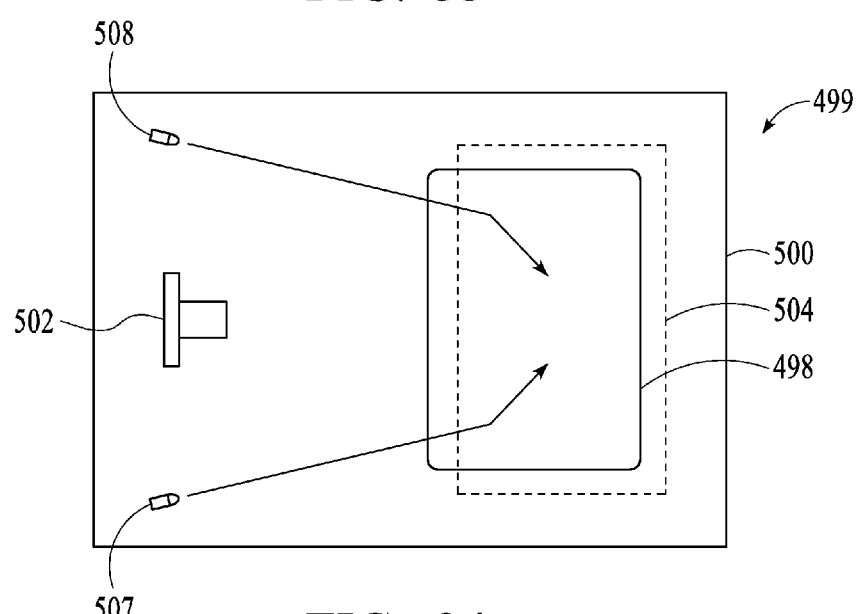

FIG. 33 shows a simplified top view and FIG. 34 shows a simplified side view of a duplex card scanner 499 that uses a camera system that includes a camera 501 and a camera 502 within a scanner housing 500. A card 498 is positioned between a mirror 503 and a mirror 504 oriented as shown. Camera 501 captures an image that includes a first side of card 498. Camera 502 captures an image that includes a second side of card 498. Illumination for the first side of card 498 is provided by light from a light source 505 and a light source 506 reflected from mirror 503. For example, light source 505 and a light source 506 are placed within scanner housing 500 at locations configured so that resulting bright regions from each of light source 505 and light source 506 occur at different locations of the first side of card 498. This facilitates capturing images with one light source activated at a time and then removing bright regions as described above, for example, using a pixel comparator process, a spatial filtering process or another filtering process, as discussed above.

Illumination for the second side of card 498 is provided by light from a light source 507 and a light source 508 reflected through mirror 504. For example, light source 507 and a light source 508 are placed within scanner housing 500 at locations configured so that resulting bright regions from each of light source 507 and light source 508 occur at different locations of the second side of card 498. This facilitates capturing images with one light source activated at a time and then removing bright regions as described above, for example, using a pixel comparator process, a spatial filtering process or another filtering process, as discussed above.

Figure 35:
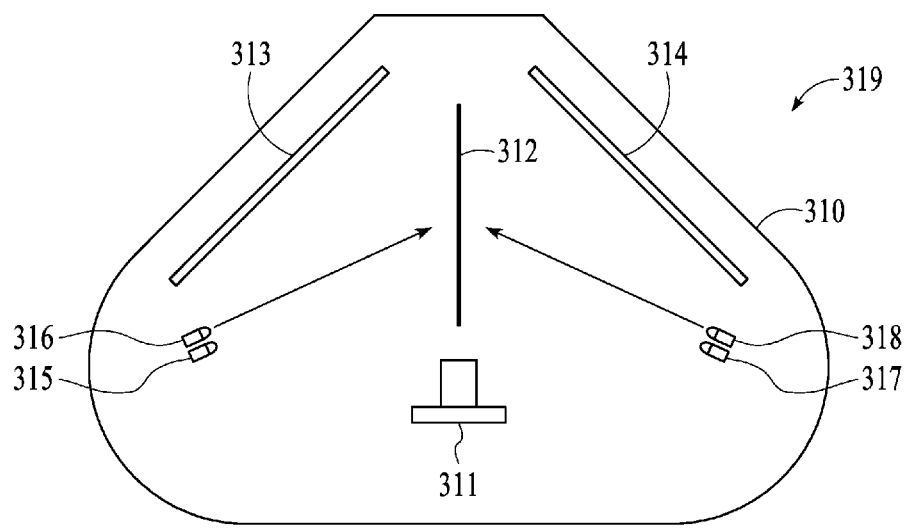
FIG. 35 shows a simplified top view of a duplex card scanner.

FIG. 35 shows a simplified top view of a duplex card scanner 319 that uses a camera system that includes a camera 311 within a scanner housing 310. A card 312 is positioned between a mirror 313 and a mirror 314 oriented as shown. Camera 311 captures an image that includes both a first side of card 312 and a second side of card 312. The image is cropped to produce an image capture of first side of card 312 and an image capture of second side of card 312. The image capture of first side of card 312 and the image capture of second side of card 312 can be processed independently to allow duplex capture, handling and reproduction of card 312.

Illumination for the first side of card 312 is provided by direct lighting from a light source 315 and a light source 316. For example, light source 315 and a light source 316 are placed within scanner housing 310 at locations configured so that resulting bright regions from each of light source 315 and light source 316 occur at different locations of the first side of card 312. This facilitates capturing images with one light source activated at a time and then removing bright regions as described above, for example, using a pixel comparator process, a spatial filtering process or another filtering process, as discussed above.

Illumination for the second side of card 312 is provided by direct lighting from a light source 317 and a light source 318. For example, light source 317 and a light source 318 are placed within scanner housing 310 at locations configured so that resulting bright regions from each of light source 317 and light source 318 occur at different locations of the second side of card 312. This facilitates capturing images with one light source activated at a time and then removing bright regions as described above, for example, using a pixel comparator process, a spatial filtering process or another filtering process, as discussed above.

Figure 36:
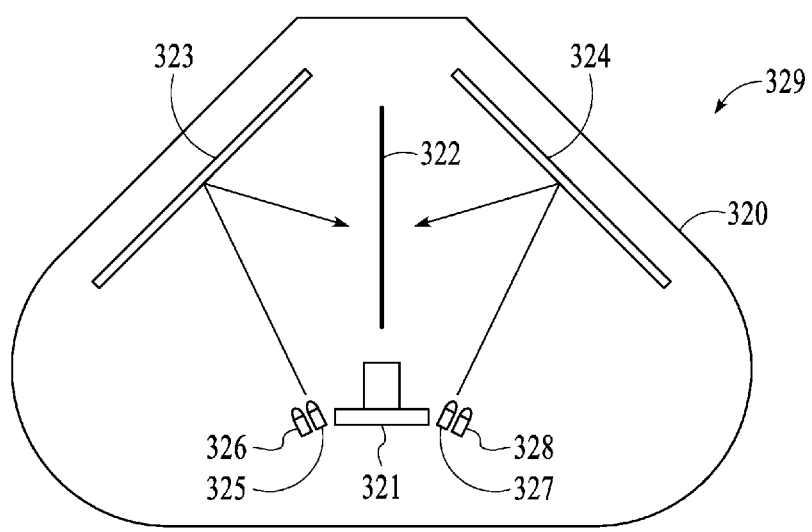
FIG. 36 shows a simplified top view of a duplex card scanner.

FIG. 36 shows a simplified top view of a duplex card scanner 329 that uses a camera 321 within a scanner housing 320. A card 322 is positioned between a mirror 323 and a mirror 324 oriented as shown. Camera 321 captures an image that includes both a first side of card 322 and a second side of card 322. The image is cropped to produce an image capture of first side of card 322 and an image capture of second side of card 322. The image capture of first side of card 322 and the image capture of second side of card 322 can be processed independently to allow duplex capture, handling and reproduction of card 322.

Illumination for the first side of card 322 is provided by light from a light source 325 and a light source 326 reflected from mirror 323. For example, light source 325 and a light source 326 are placed within scanner housing 320 at locations configured so that resulting bright regions from each of light source 325 and light source 326 occur at different locations of the first side of card 322. This facilitates capturing images with one light source activated at a time and then removing bright regions as described above, for example, using a pixel comparator process, a spatial filtering process or another filtering process, as discussed above.

Illumination for the second side of card 322 is provided by light from a light source 327 and a light source 328 reflected from mirror 324. For example, light source 327 and a light source 328 are placed within scanner housing 320 at locations configured so that resulting bright regions from each of light source 327 and light source 328 occur at different locations of the second side of card 322. This facilitates capturing images with one light source activated at a time and then removing bright regions as described above, for example, using a pixel comparator process, a spatial filtering process or another filtering process, as discussed above.

Figure 37:
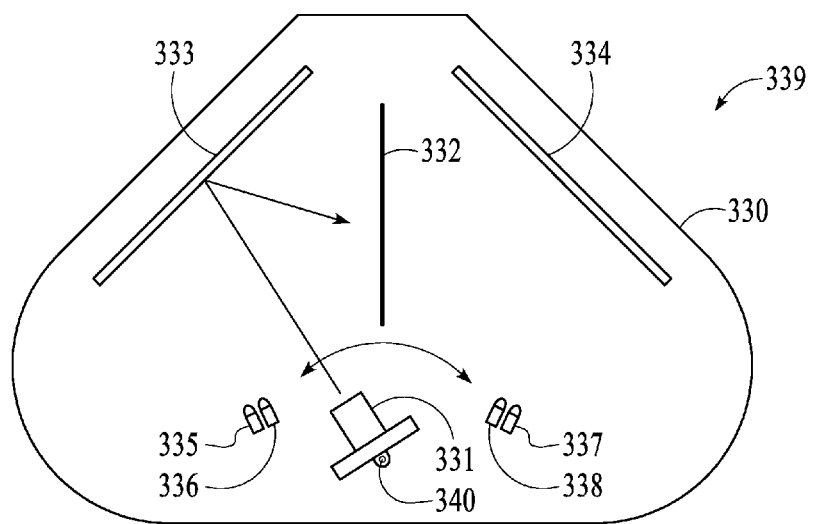
FIG. 37 and FIG. 38 show simplified top views of a duplex card scanner.
Figure 38:
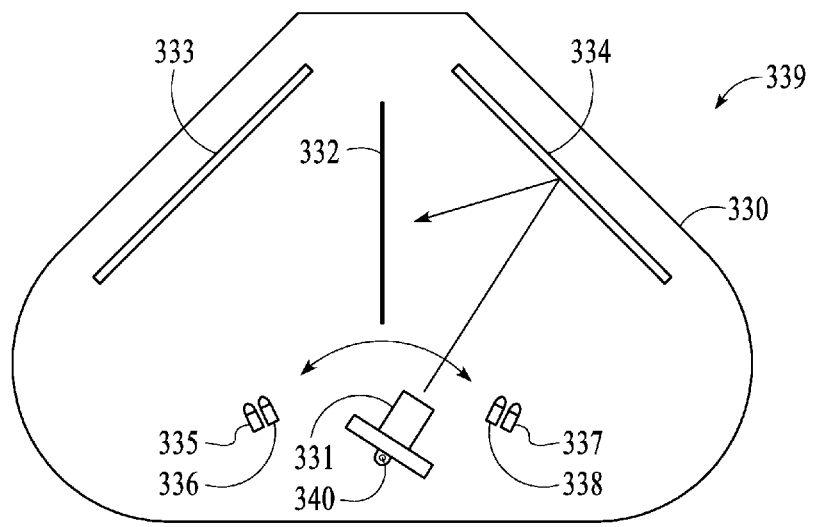

FIG. 37 and FIG. 38 show simplified top views of a duplex card scanner 339 that uses a camera 331 within a scanner housing 330. A card 332 is positioned between a mirror 333 and a mirror 334 oriented as shown. Camera 331 is rotatable around a pivot 340. When camera 331 is pivoted to a position shown in FIG. 37, camera 331 is rotated to capture an image of a first side of card 332. Illumination for the first side of card 332 is provided by light from a light source 335 and a light source 336 reflected from mirror 333. For example, light source 335 and a light source 336 are placed within scanner housing 330 at locations configured so that resulting bright regions from each of light source 335 and light source 336 occur at different locations of the first side of card 332. This facilitates capturing images with one light source activated at a time and then removing bright regions as described above, for example, using a pixel comparator process, a spatial filtering process or another filtering process, as discussed above.

When camera 331 is pivoted to a position shown in FIG. 38, camera 331 is rotated to capture an image of a second side of card 332. Illumination for the second side of card 332 is provided by light from a light source 337 and a light source 338 reflected from mirror 334. For example, light source 337 and a light source 338 are placed within scanner housing 330 at locations configured so that resulting bright regions from each of light source 337 and light source 338 occur at different locations of the second side of card 332. This facilitates capturing images with one light source activated at a time and then removing bright regions as described above, for example, using a pixel comparator process, a spatial filtering process or another filtering process, as discussed above.

Figure 39:
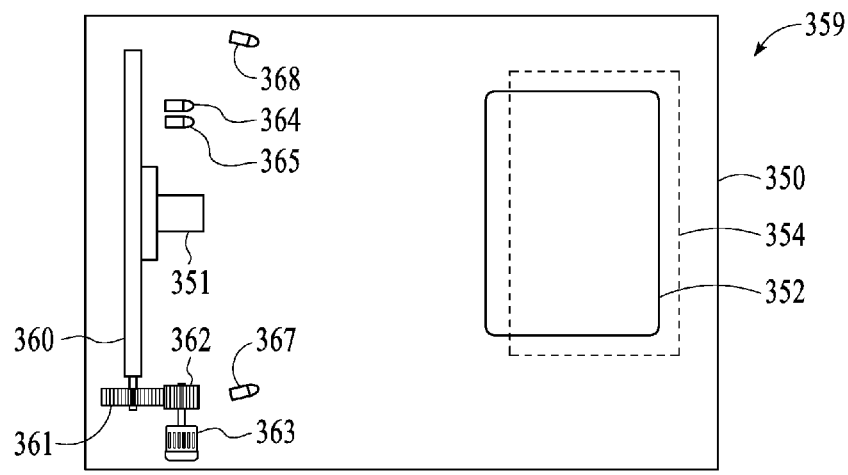
FIG. 39 shows a simplified side view and FIG. 40 shows an even more simplified top view that illustrates implementation of a swivel within a duplex card scanner.
Figure 40:
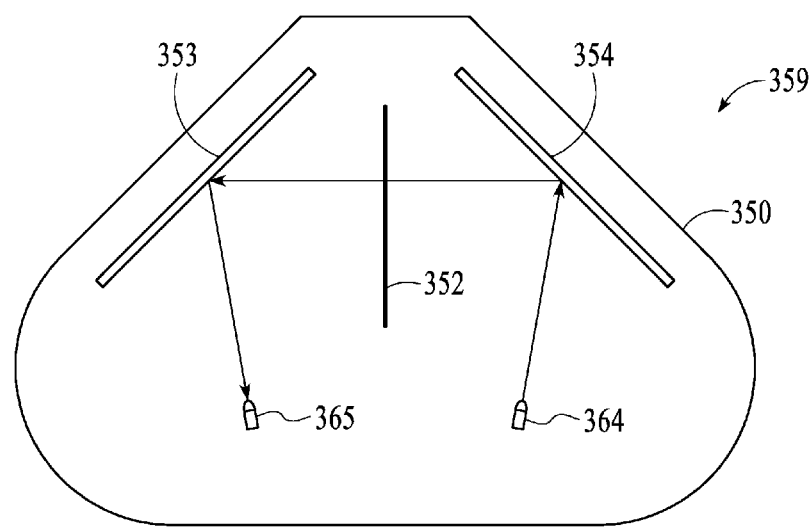

FIG. 39 shows a simplified side view and FIG. 40 shows an even more simplified top view that illustrates implementation of a swivel within a duplex card scanner 359 that uses a camera 351 within a scanner housing 350. A card 352 is positioned between a mirror 353 and a mirror 354 oriented as shown. Camera 351 is mounted on a camera post 360. A motor 363 through a pinion 362 and a gear 361 rotates camera post so that camera 351 captures an image of a first side of card 352 or a second side of card 352 as described above. For example, Illumination for the second side of card 352 is provided by light from a light source 367 and a light source 368 reflected from mirror 354. For example, light source 367 and a light source 368 are placed within scanner housing 350 at locations configured so that resulting bright regions from each of light source 367 and light source 368 occur at different locations of the second side of card 352. This facilitates capturing images with one light source activated at a time and then removing bright regions as described above, for example, using a pixel comparator process, a spatial filtering process or another filtering process, as discussed above. A light emitter 364 and a sensor 365 are used to detect when card 352 is present within scanner housing 350, as illustrated by FIG. 40. For example light emitter 364 is an infrared light emitter and sensor 365 is an infrared light detector. Light from light emitter 364 is reflected by mirror 354 and by mirror 353 before reaching infrared light detector 364. When card 352 is present, light from light emitter 364 does not reach sensor 365.

Figure 41:
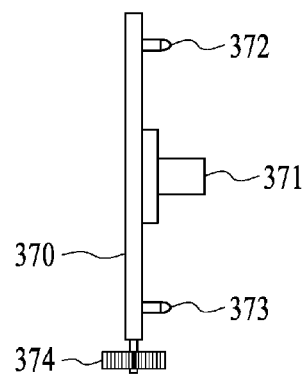
FIG. 41 shows a configuration with light sources mounted on a post along with a camera.

FIG. 41 shows a light source 372 and a light source 373 can also be mounted on a post 370 along with a camera 371. Light source 372 and light source 373 can be used to light both sides of a card. Light source 372 and light source 373 are placed so that resulting bright regions from each of light source 372 and light source 373 occur at different locations for both sides of the card. This facilitates capturing images with one light source activated at a time and then removing bright regions as described above, for example, using a pixel comparator process, a spatial filtering process or another filtering process, as discussed above.

Figure 42:
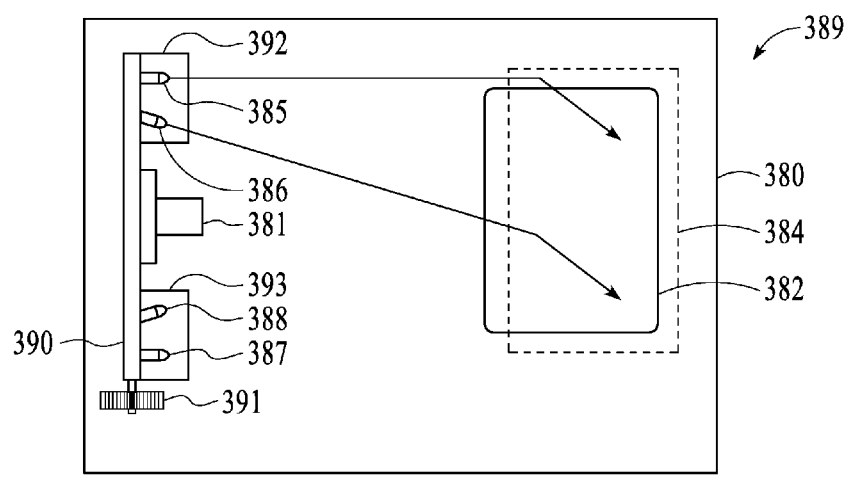
FIG. 42 shows a simplified side view that illustrates implementation of a swivel within a duplex card scanner.

FIG. 42 shows a simplified side view that illustrates implementation of a swivel within a duplex card scanner 389 that uses a camera 381 within a scanner housing 380. A card 382 is positioned between two mirrors. Mirror 384 is shown in FIG. 42. Camera 381 is mounted on a camera post 390 attached to a gear 391 which rotates camera post so that camera 381 captures an image of a first side of card 382 or a second side of card 382 as described above. A light source 392 and a light source 393 are also mounted on post 390 along with camera 381. Light source 392 and light source 393 are used to light both sides of card 382. Light source 392 and light source 393 are placed so that resulting bright regions from each of light source 392 and light source 393 occur at different locations for both sides of card 382. This facilitates capturing images with one light source activated at a time and then removing bright regions as described above, for example, using a pixel comparator process, a spatial filtering process or another filtering process, as discussed above. For example, light source 392 is a light box that includes a LED 385 and an LED 386. For example, light source 393 is a light box that includes a LED 387 and an LED 388.

Figure 43:
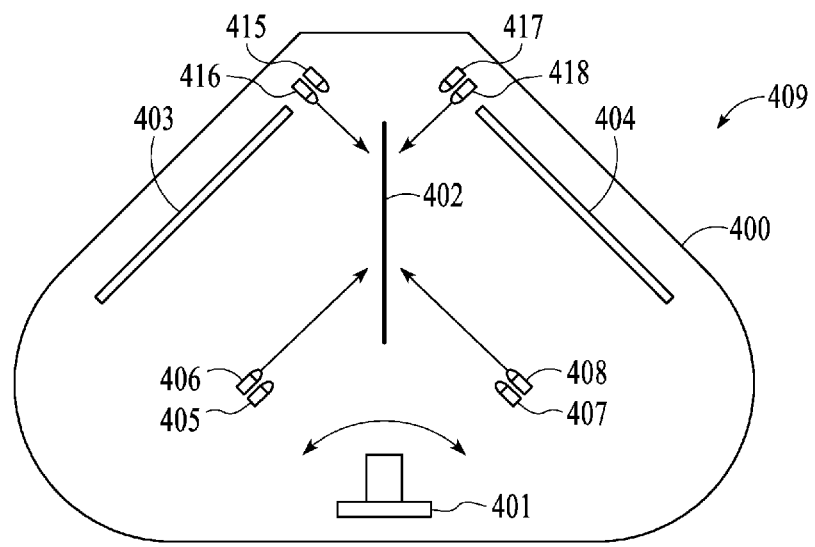
FIG. 43 shows a simplified top view and FIG. 44 shows a simplified side view of a duplex card scanner.
Figure 44:
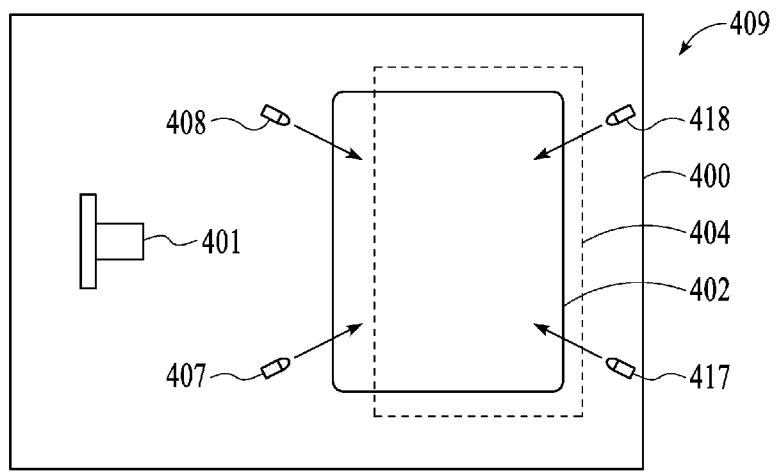

FIG. 43 show simplified top views and FIG. 44 shows a simplified side view of a duplex card scanner 409 that uses a camera 401 within a scanner housing 400. A card 402 is positioned between a mirror 403 and a mirror 404 oriented as shown. Camera 401 is rotatable around a pivot. When camera 401 is pivoted to a first position, camera 401 is rotated to capture an image of a first side of card 402. Illumination for the first side of card 402 is provided by direct lighting from a light source 405, a light source 406, a light source 415 and a light source 416. For example, light source 405, light source 406, light source 415 and light source 416 are placed within scanner housing 400 at locations configured so that resulting bright regions occur at different locations of the first side of card 402. This facilitates capturing images with one light source activated at a time and then removing bright regions as described above, for example, using a pixel comparator process, a spatial filtering process or another filtering process, as discussed above.

When camera 401 is pivoted to capture an image of a second side of card 402, illumination for the second side of card 402 is provided by direct lighting from a light source 407, a light source 408, a light source 417 and a light source 418. For example, light source 407, light source 408, light source 417 and light source 418 are placed within scanner housing 400 at locations configured so that resulting bright regions occur at different locations of the second side of card 402. This facilitates capturing images with one light source activated at a time and then removing bright regions as described above, for example, using a pixel comparator process, a spatial filtering process or another filtering process, as discussed above.

Figure 45:
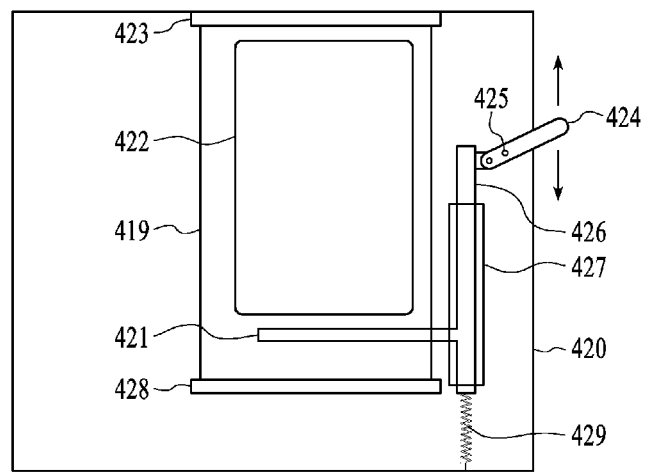
FIG. 45 is a simplified diagram showing a card support mechanism.

FIG. 45 is a simplified diagram showing scanner housing 420 that includes a card support mechanism implemented using an anti-reflective glass holder 419 that has two anti-reflective glass sheets of glass held between an upper glass support 423 and a lower glass support 428. While anti-reflective glass is preferred, normal uncoated sheets of glass may also be used. When a card 422 is placed between the two anti-reflective glass sheets, the bottom of card 422 rests on a card base 421. A lever 424 that rotates around a pivot 425 raises and lowers a card base support 426 within a card base support guide 427, allowing user control of the location of card base 421. Spring 429, attached to card base support 426, returns card base 421 in a desired default position when the user does not exert pressure on lever 424. For example, the default position is in a lowered position.

Figure 46:
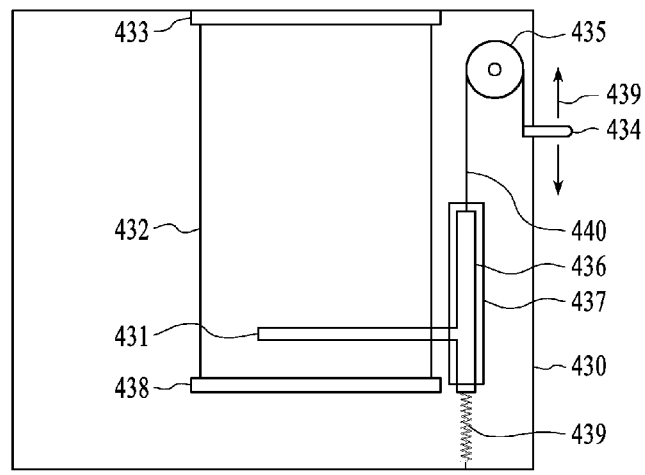
FIG. 46 is a simplified diagram showing a card support mechanism.

FIG. 46 is a simplified diagram showing scanner housing 430 that includes a card support mechanism implemented using an anti-reflective glass holder 432 that has two anti-reflective glass sheets of glass held between an upper glass support 433 and a lower glass support 438. When a card is placed between the two anti-reflective glass sheets, the bottom of card rests on a card base 431. A lever 434 attached to a cable 440 that rotates around a pulley 435 raises and lowers a card base support 436 within a card base support guide 437, allowing user control of the location of card base 431. Spring 439, attached to card base support 436, returns card base 431 in a desired default position when the user does not exert pressure on lever 434. For example, the default position is in a lowered position.

Figure 47:
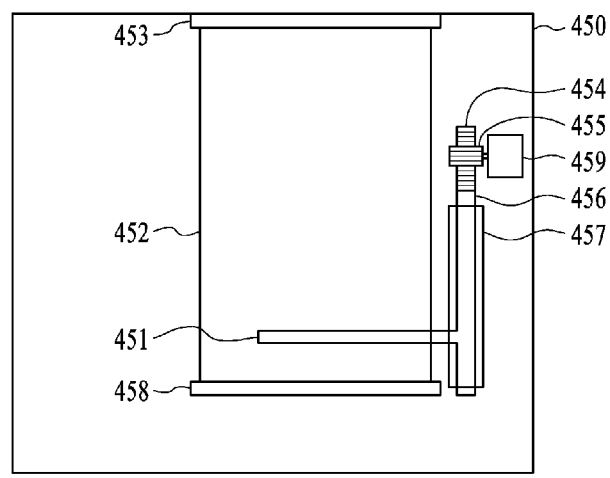
FIG. 47 is a simplified diagram showing a card support mechanism.

FIG. 47 is a simplified diagram showing scanner housing 450 that includes a card support mechanism implemented using an anti-reflective glass holder 452 that has two anti-reflective glass sheets of glass held between an upper glass support 453 and a lower glass support 458. When a card is placed between the two anti-reflective glass sheets, the bottom of card rests on a card base 451. A motor 459 attached to a pinion 455 that is engaged with a rack 454 that is part of a card base support 456 is used to raise and lower card base support 456 within a card base support guide 457, allowing user control of the location of card base 451.

Figure 48:
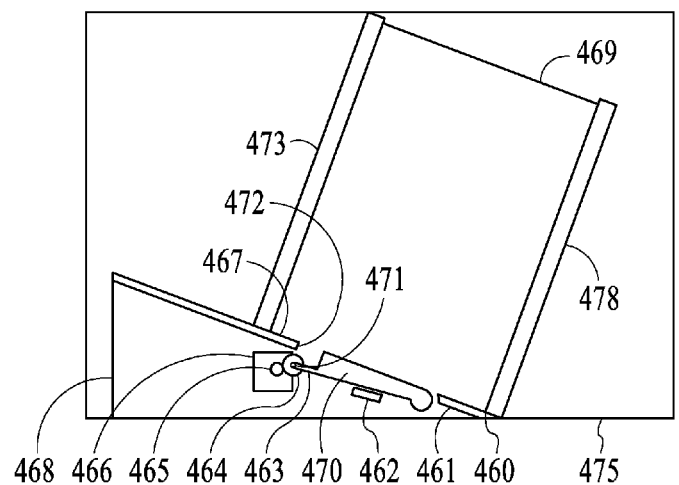
FIG. 48, FIG. 49 and FIG. 50 are simplified diagrams showing a card support mechanism.
Figure 49:
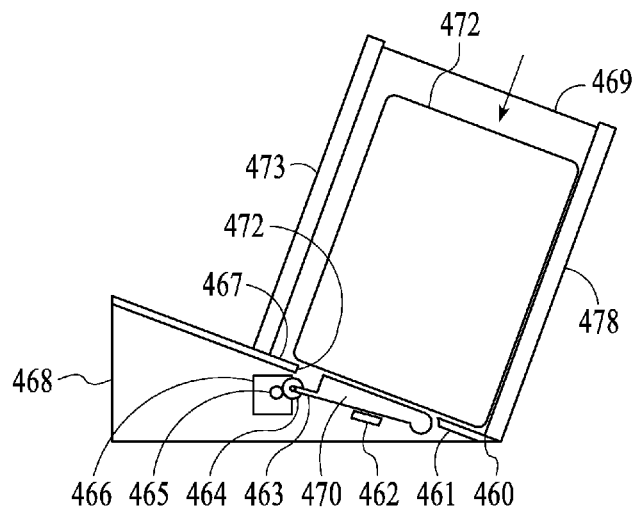
Figure 50:
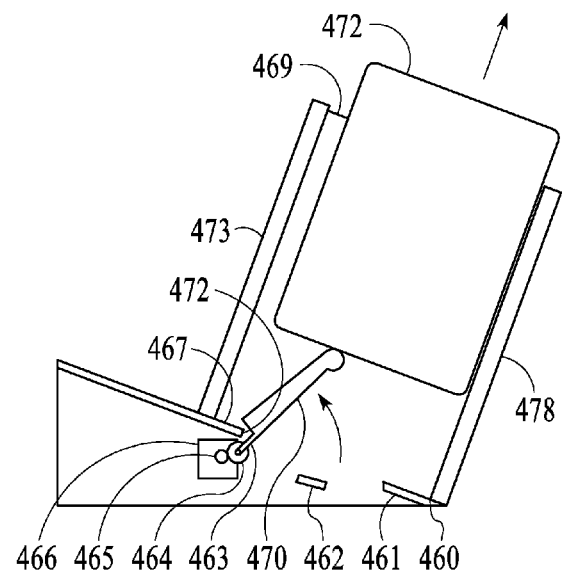

FIG. 48, FIG. 49 and FIG. 50 are simplified diagrams showing scanner housing 475 that includes a card support mechanism implemented using an anti-reflective glass holder 469 that has two anti-reflective glass sheets of glass held between an upper glass support 473 and a lower glass support 478. FIG. 48 shows scanner housing 475 ready to receive a card.

FIG. 49 shows a card 472 placed in anti-reflective glass holder 469 between the two anti-reflective sheets of glass. When a card 472 is placed between the two anti-reflective glass sheets, the bottom of card 472 rests on a lower fixed base section 461, an upper fixed base section 467 and a moveable base section 470 which are inclined because of an angled support base 468. Angled support base 468 is a support structure that can be integrated into the card reading housing. Moveable base section 470 rests against a lower stop 462. Because of angled support base 468, anti-reflective glass holder 469 is angled so that card 472 slides into alignment corner 460, thus assuring a consistent predictable position of card 472 within anti-reflective glass holder 469. A swing arm 463 is attached to moveable base section 470 and a gear 464.

When a card is ready for ejection, a motor 466 rotates pinion 465 to rotate gear 464 and thus attached swing arm 463 and moveable base section 470, as shown in FIG. 50. An upper stop 472 prevents over rotation of moveable base section 470. As moveable base section 470 is rotated, moveable base section 470 pushes card 472 up and a portion of card 472 out of anti-reflective glass holder 469, allowing a user to easily remove card 472 from scanner housing 475. After removal of card 472, motor rotates pinion 465 in the reverse direction and thus rotates gear 464, attached swing arm 463 and moveable base section 470 so that moveable base section 470 again rests against lower stop 462, ready for a next card to be placed in anti-reflective glass holder 469.

Figure 51:
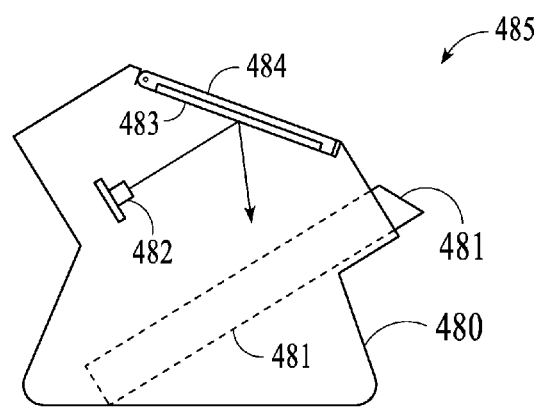
FIG. 51, FIG. 52, FIG. 53 and FIG. 54 are simplified diagrams that show different configurations of scanners that allow access to clean a mirror via opening or removing a mirror housing section of each scanner.

FIG. 51 is a simplified block diagram of a scanner 485 that includes scanner housing 480, a card tray 481, a camera 482, a mirror 483 and a mirror housing section 484. To reduce complexity of the drawing, other scanner parts are omitted. Mirror 483 can become dirty over time and diminish the clarity of images captured by camera 482. For this reason it is desirable to allow user access to mirror 483 for cleaning.

Card tray 481 is inclined to a plane located between horizontal and vertical so that due to gravity a card placed on the card tray 481 will slide down and self-align to a lowest corner of the card tray 481 for image capture. The input tray may be removable or may be fused as part of scanner housing 480. As shown there is support structure integrated into card reading housing 480 so that card tray 481 is at the inclined angle.

Figure 56:
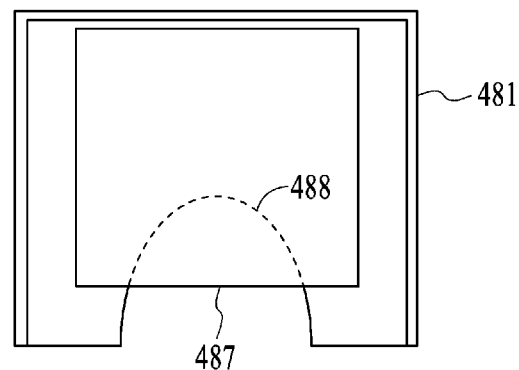
FIG. 56 shows a card input tray have a cut-out region to simplify user access of a card for removal from the card input tray.

FIG. 56 shows that card tray 481 can have a cut out region 488 that allows a card 487 within card tray 481 to be easily removed by a user using a thumb and finger.

For example, the scanner illustrated by FIG. 51 can be implemented similar to card reader 600 shown in FIG. 24 and FIG. 25, where card reader 600 is rotated and mounted such that an input tray is inclined from a horizontal plane.

Figure 52:
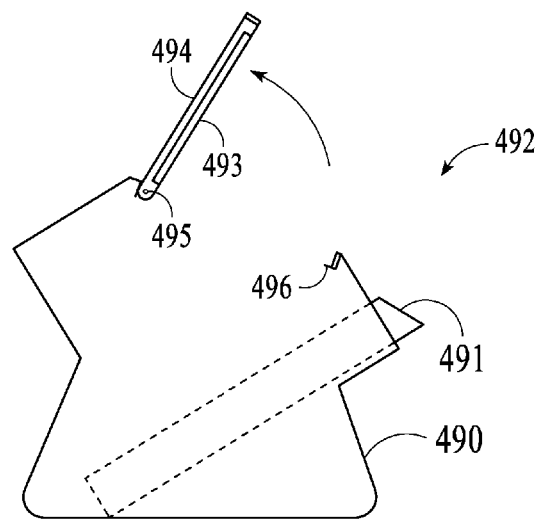

For example, FIG. 52 is a simplified block diagram of a scanner 492 that includes scanner housing 490, a card tray 491, a mirror 493 and a mirror housing section 494. Mirror housing section 494 is attached to scanner housing 490 via a pivot 495 allowing mirror housing section 494 to rotated around pivot 495 to an open position, (shown in FIG. 52) so that a user can access mirror 493 for cleaning. When in use, mirror housing section 494 is returned to a closed position where mirror housing section 494 rests against a stop 496 in scanner housing 490. As shown there is support structure integrated into card reading housing 490 so that card input tray 491 is at the inclined angle.

Figure 53:
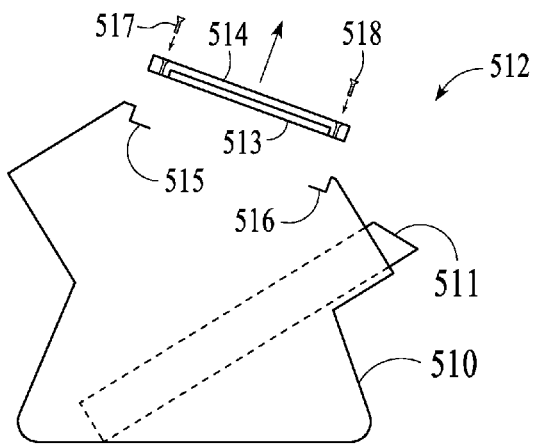

In another example, FIG. 53 shows a simplified block diagram of a scanner 512 that includes scanner housing 510, a card tray 511, a mirror 513 and a mirror housing section 514. When mirror housing section 514 is detached from housing 510, this allows a user to access mirror 513 for cleaning. When mirror housing section 514 is detached from housing 520, this allows a user to access mirror 513 for cleaning. When cleaning is completed, mirror housing section 514 is returned to a closed position with screw 517 fastening mirror housing section 514 to a ledge 515 in housing 510, and screw 518 fastening mirror housing section 514 to a ledge 516 in housing 510. Alternatively, a catch, clips or other fastening device can be used in place of screw 517 and screw 518.

Figure 54:
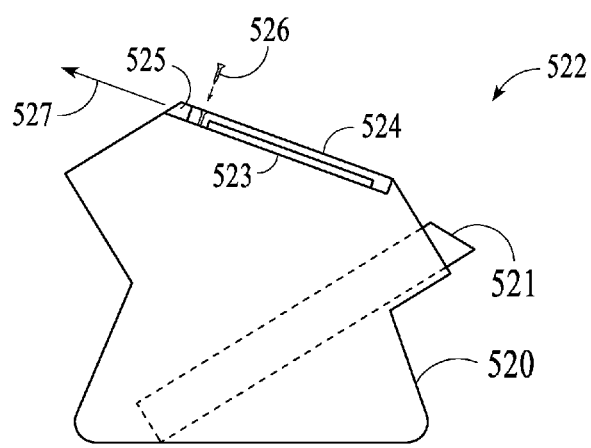

In another example, FIG. 54 shows a simplified block diagram of a scanner 522 that includes scanner housing 520, a card tray 521, a mirror 523 and a mirror housing section 524. When mirror housing section 524 is detached from housing 520, this allows a user to access mirror 523 for cleaning. When cleaning is completed, mirror housing section 524 is returned to a closed position with mirror housing section 524 sliding within grooves 525 within housing 520. A screw 526 is used to secure mirror housing section 524 within grooves 525. Alternatively, a catch, clips or other fastening device can be used in place of screw 526.

Figure 55:
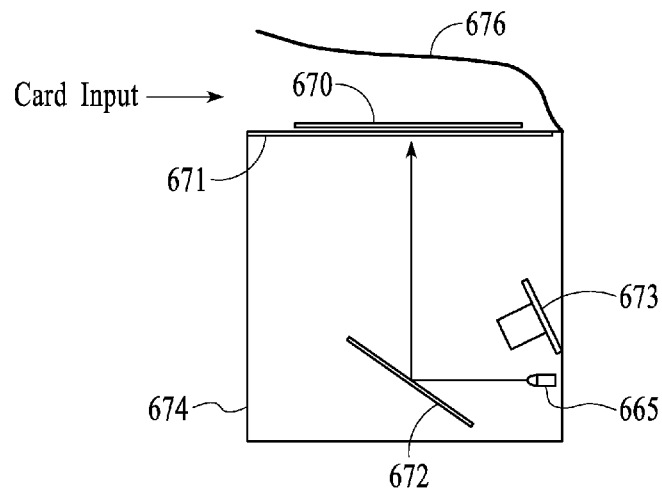
FIG. 55 shows a simplified side view of a card reader.

FIG. 55 shows a simplified side view of a card reader 660 that includes a camera 673, a mirror 672 and card reader housing 674. A glass top 671 is used to isolate camera 673 and mirror 672 from external elements such as dirt and dust. For example, glass top 671, is composed of glass that has anti-reflective coated on one or both sides to reduce the amount of surface reflection that can produce glare on a captured image.

For example, a light source 665 and another light source (not shown) are placed within card reader housing at locations configured so that resulting bright regions from light reflected off mirror 672 from each of light source 665 and the other light source occur at different locations of a document 670. This facilitates capturing images with one light source activated at a time and then removing bright regions as described above, for example, using a pixel comparator process, a spatial filtering process or another filtering process. Document 670 is placed on top of glass 671 and under a canopy cover 676. Canopy cover 676 prevents ambient light from interfering with the image capturing process. Canopy cover 676 has an open side that allows sufficient room for a user to insert document 670 onto glass top 671, as illustrated by arrow 675, and remove document 670 from glass top 671. For example, document 670 is a card.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A card scanner, comprising:
    card support mechanism for receiving a card;
    a first camera;
    a first light source mounted so that a first image of a first side of the card captured by the first camera reflects to the first camera so that a first bright region created by light reflected by the first side of the card from the first light source is within a first location on the first side of the card;
    a second light source mounted so that a second image of the first side of the card captured by the first camera reflects to the first camera so that a second bright region created by light reflected by the first side of the card from the second light source is within a second location on the first side of the card, wherein the first location and the second location do not overlap; and
    an image processor that combines the first image of the first side of the card with the second image of the first side of the card to produce a first combined image, the first bright region and the second bright region being filtered from the first combined image by the image processor.

2. A card scanner as in claim 1, wherein the image processor filters the first bright region and the second bright region from the first combined image by doing a pixel by pixel comparison of the first image with the second image so that for each pixel a least bright pixel from the first image and the second image is selected for inclusion within the first combined image.

3. A card scanner as in claim 1, wherein the image processor filters the first bright region and the second bright region from the first combined image by doing a pixel by pixel comparison of the first image with the second image so that for each pixel a least bright pixel from the first image and the second image is selected for inclusion within the first combined image, wherein the pixel by pixel is done for each color pixel at each pixel location of the first image and the second image.

4. A card scanner as in claim 1, wherein the image processor combines the first image of the first side of the card with the second image of the first side of the card to produce the first combined image by:
    using pixels of a first area of the first image to produce a corresponding first area of the first combined image, the first area of the first image not including the first bright region;
    using pixels of a second area of the second image to produce a corresponding second area of the first combined image, the second area of the second image not including the second bright region;
    filtering brightness of pixels in a third area of the first image with a first filter function to produce first filtered pixels;
    filtering brightness of pixels in a corresponding third area of the second image with a second filter function to produce second filtered pixels, the second filter function being a complementary filter function of the first filter function; and
    producing each pixel in a corresponding third area of the first combined image by adding corresponding pixel values of the first filtered pixels and the second filtered pixels;
    wherein the first area, the second area and the third area do not overlap.

5. A card scanner as in claim 1 wherein the first light source and the second light source are implemented using light emitting diodes.

6. A card scanner as in claim 1 wherein the first light source and the second light source are each implemented by a light box containing a plurality of light emitting diodes.

7. A card scanner as in claim 1 additionally including a mirror;
    wherein the first light source and the second light source are each configured to shine light directly on the first side of the card; and
    wherein the first camera captures the first image and the second image as reflected by the mirror.

8. A card scanner as in claim 1 additionally including a mirror;
    wherein the first light source and the second light source are each configured to shine light toward the mirror, the light being reflected onto the first side of the card; and
    wherein the first camera captures the first image and the second image as reflected by the mirror.

9. A card scanner as in claim 1 additionally comprising;
    a second camera;
    a third light source mounted so that a third image of a second side of the card captured by the second camera reflects to the second camera so that a third bright region created by light reflected by the second side of the card from the third light source is within a third location on the second side of the card; and
    a fourth light source mounted so that a fourth image of the second side of the card captured by the second camera reflects to the second camera so that a fourth bright region created by light reflected by the second side of the card from the fourth light source is within a fourth location on the second side of the card, wherein the third location and the fourth location do not overlap;
    wherein the image processor combines the third image of the second side of the card with the fourth image of the second side of the card to produce a second combined image, the third bright region and the fourth bright region being filtered from the second combined image by the image processor.

10. A card scanner as in claim 9 additionally comprising:
    a first mirror; and
    a second mirror;
    wherein the first light source and the second light source are each configured to shine light toward the first mirror, the light being reflected onto the first side of the card;
    wherein the first camera captures the first image and the second image as reflected by the first mirror;
    wherein the third light source and the fourth light source are each configured to shine light toward the second mirror, the light being reflected onto the second side of the card; and
    wherein the second camera captures the third image and the fourth image as reflected by the second mirror.

11. A card scanner as in claim 9 additionally comprising:
a first mirror; and
a second mirror;
wherein the first light source and the second light source are each configured to shine light directly on the first side of the card;
wherein the first camera captures the first image and the second image as reflected by the first mirror;
wherein the third light source and the fourth light source are each configured to shine light directly on the second side of the card; and
wherein the second camera captures the third image and the fourth image as reflected by the second mirror.

12. A card scanner as in claim 1 additionally comprising;
a third light source mounted so that a third image of a second side of the card captured by the first camera reflects to the first camera so that a third bright region created by light reflected by the second side of the card from the third light source is within a third location on the second side of the card; and
a fourth light source mounted so that a fourth image of the second side of the card captured by the first camera reflects to the first camera so that a fourth bright region created by light reflected by the second side of the card from the fourth light source is within a fourth location on the second side of the card, wherein the third location and the fourth location do not overlap;
wherein the image processor combines the third image of the second side of the card with the fourth image of the second side of the card to produce a second combined image, the third bright region and the fourth bright region being filtered from the second combined image by the image processor.

13. A card scanner as in claim 12 additionally comprising:
a first mirror; and
a second mirror;
wherein the first light source and the second light source are each configured to shine light toward the first mirror, the light being reflected onto the first side of the card;
wherein the first camera captures the first image and the second image as reflected by the first mirror;
wherein the third light source and the fourth light source are each configured to shine light toward the second mirror, the light being reflected onto the second side of the card; and
wherein the first camera captures the third image and the fourth image as reflected by the second mirror.

14. A card scanner as in claim 12 additionally comprising:
a first mirror; and
a second mirror;
wherein the first light source and the second light source are each configured to shine light directly on the first side of the card;
wherein the first camera captures the first image and the second image as reflected by the first mirror;
wherein the third light source and the fourth light source are each configured to shine light directly on the second side of the card; and
wherein the first camera captures the third image and the fourth image as reflected by the second mirror.

15. A card scanner as in claim 12 additionally comprising:
a pivot on which the first camera is mounted;
a first mirror; and
a second mirror;
wherein the first camera is rotated into a first position to capture the first image and the second image as reflected by the first mirror;
wherein the first camera is rotated into a second position to capture the third image and the fourth image as reflected by the second mirror.

16. A card scanner as in claim 12 additionally comprising:
a first mirror; and
a second mirror;
wherein the first camera is positioned to capture the first image and the second image as reflected by the first mirror and to capture the third image and the fourth image as reflected by the second mirror;
and wherein a view of the first camera is sufficiently wide to simultaneously capture the first image as reflected by the first mirror and the third image as reflected by the second mirror, and to simultaneously capture the second image as reflected by the first mirror and the fourth image as reflected by the second mirror.

17. A card scanner as in claim 1 additionally comprising:
a post on which the first camera, the first light source and the second light source are mounted;
a first mirror; and
a second mirror;
wherein the first camera is rotated into a first position to capture the first image and the second image as reflected by the first mirror;
wherein the first camera is rotated into a second position to capture a third image of a second side of the card and a fourth image of a second side of the card as reflected by the second mirror;
wherein the first light source is positioned so that the third image of the second side of the card captured by the first camera reflects to the first camera so that a third bright region created by light reflected by the second side of the card from the first light source is within a third location on the second side of the card;
wherein the second light source is positioned so that the fourth image of the second side of the card captured by the first camera reflects to the first camera so that a fourth bright region created by light reflected by the second side of the card from the second light source is within a fourth location on the second side of the card;
wherein the third location and the fourth location do not overlap; and
wherein the image processor combines the third image of the second side of the card with the fourth image of the second side of the card to produce a second combined image, the third bright region and the fourth bright region being filtered from the second combined image by the image processor.

18. A card scanner as in claim 1, wherein the card support mechanism includes:
a card tray that is inclined to a plane located between horizontal and vertical so that due to gravity a card placed on the card tray will slide down and self-align to a lowest corner of the card tray.

19. A card scanner as in claim 1, additionally comprising:
a mirror, wherein the first camera captures the first image and the second image as reflected by the mirror; and
a housing for the card scanner, the housing including,
a mirror housing section that can be opened or removed to allow cleaning of the mirror.

20. A card scanner as in claim 1, wherein the card support mechanism includes:
a glass holder that includes two glass sheets separated by a distance greater than a thickness of the card; and a moveable card base on which the card rests when the card is placed between the two glass sheets, the moveable card base allowing a user to control location of the moveable card base, wherein in a first location of the moveable card base, the card is positioned for the first camera to capture the first image and the second image and wherein in a second location, the card is positioned to be removed by the user from the card scanner.

21. A card scanner as in claim 1, wherein the card support mechanism includes:
a glass holder that includes two glass sheets separated by a distance greater than a thickness of the card; and
a card base on which the card rests when the card is placed between the two sheets, including
a moveable card base section that can be rotated around a pivot, wherein in a first location of the moveable card base section the card is positioned for the first camera to capture the first image and the second image and wherein in a second location of the moveable card base section, the card is positioned to be removed by a user from the card scanner.

22. A card scanner as in claim 1, wherein the card support mechanism includes:
a glass holder that includes two glass sheets separated by a distance greater than a thickness of the card;
a card base on which the card rests when the card is placed between the two glass sheets;
wherein the glass holder and the card base are inclined to a plane between horizontal and vertical sufficiently so that due to gravity, the card, when placed between the two glass sheets, will slide down along the glass holder and self-align to a lowest corner between the glass holder and the card base in a position for image capture.

23. A card scanner as in claim 1 additionally comprising:
a first mirror used to capture images on a first side of the card; and
a second mirror used to capture images on a second side of the card;
a light emitter that emits light; and
a light sensor that detects light from the light emitter;
wherein the light emitter and the light sensor are configured to be in locations within the card scanner so that when the card is not placed within the card scanner, the light from the light emitter is reflected by the first mirror and the second mirror before reaching the light sensor and so that when the card is placed within the card scanner, the card blocks light from the light emitter from reaching the light sensor.

24. A card scanner as in claim 1, wherein the card support mechanism includes:
a glass top; and
a flat lid located over the glass top, the flat lid swinging open to allow placement of the card on the glass top.

25. A card scanner as in claim 1, wherein the card support mechanism includes:
a glass top; and
a canopy cover with an open side that allows sufficient room for a user to insert the card on the glass top and remove the card from the glass top.

26. A card reader, comprising:
a card reader housing;
a card input tray supported by the card reader housing, the card input tray providing automated alignment of a card by being at an inclined angle sufficiently steep so that when the card is placed into a front of the card input tray, the card will tend to slide to a back of the card input tray and rest against a back wall of the card input tray, the back wall aligning the card to minimize document skew when scanning; and
a light source that illuminates the card when the card is within the card input tray;
a camera that captures a first image of a first side of the card and a second image of the first side of the card; and
an image processor that combines the first image of the first side of the card with the second image of the first side of the card to produce a first combined image;
wherein a support structure is integrated into the card reader housing so that the card input tray is at the inclined angle.

27. A card scanner, comprising:
card support mechanism for receiving a card, the card support mechanism including:
a glass holder that includes two glass sheets separated by a distance greater than a thickness of the card, and
a moveable card base on which the card rests when the card is placed between the two sheets, the moveable card base allowing a user to control location of the moveable card base;
a light source that illuminates the card when the card is within the card support mechanism;
a camera system that captures a first image and a second image of a first side of the card and that captures a first image and a second image of a second side of the card; and
an image processor that combines the first image and the second image of the first side of the card to produce a first combined image and that combines the first image and the second image of the second side of the card to produce a second combined image;
wherein when the user places the moveable card base in a first location, the card is positioned for the camera system to capture the first image and the second image of the first side of the card and to capture the first image and the second image of the second side of the card; and
wherein when the user places the moveable card base in a second location, the card is positioned to be removed by the user from the card scanner.

* * * * *